(12) United States Patent
Liu et al.

(10) Patent No.: US 12,732,839 B2
(45) Date of Patent: Sep. 8, 2026

(54) SYSTEM AND METHOD FOR COORDINATED TRANSMISSIONS AND FEEDBACK

(71) Applicant: Huawei Technologies Co., Ltd., Shenzhen (CN)

(72) Inventors: Jialing Liu, Palatine, IL (US); Weimin Xiao, Hoffman Estates, IL (US); Qian Cheng, Naperville, IL (US); Zhigang Rong, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 602 days.

(21) Appl. No.: 18/160,898

(22) Filed: Jan. 27, 2023

(65) Prior Publication Data

US 2023/0180034 A1 Jun. 8, 2023

Related U.S. Application Data

(63) Continuation of application No. PCT/US2020/044349, filed on Jul. 30, 2020.

(51) Int. Cl.

*H04W 24/08* (2009.01)
*H04L 5/00* (2006.01)
*H04W 24/10* (2009.01)

(52) U.S. Cl.

CPC .......... *H04W 24/08* (2013.01); *H04L 5/0051* (2013.01); *H04W 24/10* (2013.01)

(58) Field of Classification Search

CPC ...... H04W 24/08; H04W 24/10; H04L 5/005; H04L 1/0026; H04L 1/0031; H04L 5/0057; H04L 5/0094; H04B 7/0626; H04B 7/0639

See application file for complete search history.

(56) References Cited

U.S. PATENT DOCUMENTS 10,164,747 B2 12/2018 Onggosanusi et al.
10,827,477 B2 * 11/2020 Hang .................... H04W 72/23
11,362,715 B2 6/2022 Noh et al.
2018/0076873 A1 * 3/2018 Xiao .................... H04B 7/0626
(Continued)

FOREIGN PATENT DOCUMENTS

CN 103733676 A 4/2014
CN 107636984 A 1/2018
(Continued)

OTHER PUBLICATIONS

E. Onggosanusi et al., “Modular and High-Resolution Channel State Information and Beam Management for 5G New Radio,” in IEEE Communications Magazine, vol. 56, No. 3, pp. 48-55, Mar. 2018, doi: 10.1109/MCOM.2018.1700761. (Year: 2018).*

*Primary Examiner* — Phirin Sam
*Assistant Examiner* — Louis Samara
(74) *Attorney, Agent, or Firm* — Slater Matsil, LLP

(57) ABSTRACT

A user equipment (UE) may measure reference signals (RSs) that are transmitted on one or more RS resources, whereby generating a RS measurement. The UE may determine, based on the RS measurement and a reporting rule, a RS resource of the one or more RS resources as a first type of resource of a plurality types of resources, and based thereon, generates a channel state information (CSI) report indicating the RS resource determined as the first type of resource, and reports the CSI report.

27 Claims, 13 Drawing Sheets

(56) References Cited

U.S. PATENT DOCUMENTS

| | | | | |
|---|---|---|---|---|
| 2018/0175925 | A1* | 6/2018 | Liu | H04B 7/0626 |
| 2019/0052443 | A1* | 2/2019 | Cheng | H04L 5/0007 |
| 2020/0186222 | A1 | 6/2020 | Lee et al. | |
| 2020/0304178 | A1* | 9/2020 | Wei | H04B 7/0617 |
| 2021/0143886 | A1* | 5/2021 | Chung | H04B 7/0639 |
| 2023/0101379 | A1* | 3/2023 | Manolakos | H04W 64/00 455/456.1 |
| 2023/0370223 | A1* | 11/2023 | Liu | H04L 5/0094 |
| 2024/0015551 | A1* | 1/2024 | Khoshnevisan | H04W 24/10 |

FOREIGN PATENT DOCUMENTS

| | | | | |
|---|---|---|---|---|
| RU | 2013123910 | A * | 12/2014 | H04W 24/10 |
| RU | 2575694 | C2 * | 2/2016 | |
| WO | 2019098707 | A1 | 5/2019 | |
| WO | WO-2019214504 | A1 * | 11/2019 | H04B 7/0658 |

* cited by examiner

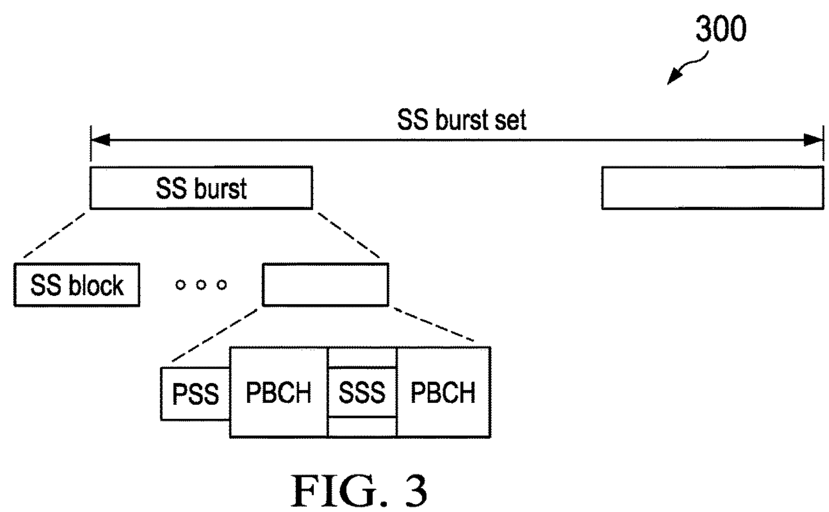
FIG. 3
400
PDCCH
402
UE1 Data
PDSCH1
404
416
412
DMRS for
PDCCH/PDSCH
414
406
UE2 Data
PDSCH2
FIG. 4
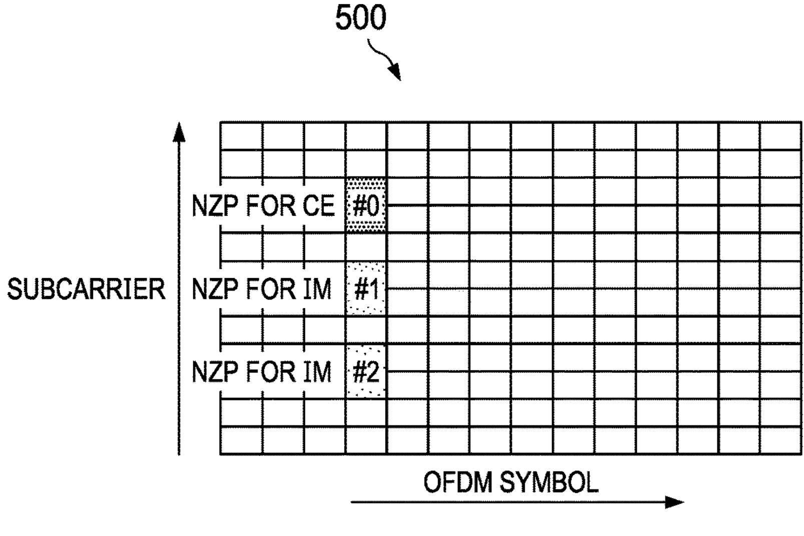
FIG. 5

1400

| CQI INDEX | MODULATION | CODE RATE X 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 14

SYSTEM AND METHOD FOR COORDINATED TRANSMISSIONS AND FEEDBACK

CROSS-REFERENCE TO RELATED APPLICATIONS

This application is continuation of International Application No. PCT/US2020/044349, filed on Jul. 30, 2020, which application is hereby incorporated herein by reference.

TECHNICAL FIELD

The present disclosure relates generally to wireless communications, and, in particular embodiments, to a system and method for coordinated transmission and feedback.

BACKGROUND

Wireless communication systems include long term evolution (LTE), LTE-A, LTE-A-beyond systems, 5G LTE, 5G New Radio (NR), etc. A modern wireless communication system may include a plurality of NodeBs (NBs), which may also be referred to as base stations, network nodes, communications controllers, cells or enhanced NBs (eNBs), and so on. A NodeB may include one or more network points or network nodes using different radio access technologies (RATs) such as high speed packet access (HSPA) NBs or WiFi access points. A NodeB may be associated with a single network point or multiple network points. A cell may include a single network point or multiple network points, and each network point may have a single antenna or multiple antennas. A network point may correspond to multiple cells operating in multiple component carriers. Generally each component carrier in carrier aggregation is a serving cell, either a primary cell (PCell) or a secondary cell (SCell).

A cell or NodeB may serve a number of users (also commonly referred to as User Equipment (UE), mobile stations, terminals, devices, and so forth) over a period of time. A communication channel from a base station to a UE is generally referred to as a downlink (DL) channel, and a transmission from the base station to the UE is a downlink transmission. A communication channel from a UE to a base station is generally referred to an uplink (UL) channel, and a transmission from the UE to the base station is an uplink transmission.

Generally, to provide any data channels in either uplink or downlink transmissions, such as a physical downlink shared channel (PDSCH) or a physical uplink shared channel (PUSCH), reference signals are transmitted. There are reference signals for a UE to perform channel/signal estimation/measurements, for demodulation of physical downlink control channel (PDCCH) and other common channels as well as for some measurements and feedback, e.g., the common/cell-specific reference signal (CRS) inherited from the Release 8/9 specification of evolved universal terrestrial radio access (E-UTRA). A dedicated/demodulation reference signal (DMRS) may be transmitted together with the PDSCH in Release 10 of E-UTRA. DMRS is used for channel estimation during PDSCH demodulation. In later E-UTRA releases and in NR, DMRS is used for channel estimation during PDCCH/PDSCH/PUSCH/PBCH demodulation. In Release 10, the channel state information reference signal (CSI-RS) is introduced in addition to CRS and DMRS. CSI-RS is used for Release 10 UEs to measure the channel status, especially for multiple antennas cases. PMI/CQI/RI and other feedback information may be based on the measurement of CSI-RS for Release 10 and beyond UEs. PMI is the precoding matrix indicator, CQI is the channel quantity indicator, and RI is the rank indicator of the precoding matrix. CSI-RS in Release 10 may support up to 8 transmission antennas, while CRS may support up to 4 transmission antennas in Release 8/9. The number of CSI-RS antenna ports may be 1, 2, 4, or 8. In addition, to support the same number of antenna ports, CSI-RS has a lower overhead due to its low density in time and frequency. In Release 13, beamformed/precoded CSI-RS is introduced, and a UE can be configured to receive one or more precoded CSI-RS and report a CSI with the associated precoded CSI-RS resource index (CRI). In NR, 16 and 32 ports in CSI-RS are supported.

SUMMARY

Technical advantages are generally achieved, by embodiments of this disclosure which describe a system and method for coordinated transmission and feedback.

According to one aspect of the present disclosure, a method is provided that includes: receiving, by a user equipment (UE), reference signals (RSs) on one or more RS resources; measuring, by the UE, the RSs received on the one or more RS resources to generate a RS measurement; determining, by the UE based on the RS measurement and a first reporting rule, a first RS resource of the one or more RS resources as a first type of resource of a first plurality of types of resources; and transmitting, by the UE, a first channel state information (CSI) report indicating the first RS resource as a first type of resource.

This enables a UE to determine or select a type of a RS resource, and report the determination or selection, which facilitates a network to perform link adaptation for communication with the UE and other UEs.

Optionally, in any of the preceding aspects, the first CSI report comprises a first channel quality indicator (CQI) value derived based on determination of the first RS resource.

Optionally, in any of the preceding aspects, the method further comprises: associating, by the UE, the first RS resource with the first type of resource.

Optionally, in any of the preceding aspects, the one or more RS resources comprise one or more ports, and each RS resource comprises one or more ports.

Optionally, in any of the preceding aspects, the one or more RS resources are configured as a non-zero power channel state information-reference signal (NZP CSI-RS) resource setting, a NZP CSI-RS resource set, or a NZP CSI-RS resource.

Optionally, in any of the preceding aspects, at least one port, one of the one or more RS resources, the NZP CSI-RS resource setting, the NZP CSI-RS resource set, or the NZP CSI-RS resource is configured for the UE as a UE-determined measurement resource.

Optionally, in any of the preceding aspects, the first plurality types of resources comprises a resource for channel measurement, a resource for interference measurement, a zero-power resource, and a muting resource.

Optionally, in any of the preceding aspects, the first type of resource is a resource for channel measurement, a resource for interference measurement, a zero-power resource or a muting resource.

Optionally, in any of the preceding aspects, the one or more RS resources and the first reporting rule are associated with a CSI report configuration (also known as CSI reporting configuration, CSI reporting setting, or CSI report setting).

Optionally, in any of the preceding aspects, the one or more RS resources are quasi co-located (QCLed) to a same channel state information—reference signal (CSI-RS) for tracking or a same synchronization signal block (SSB).

Optionally, in any of the preceding aspects, a first subset of the one or more RS resources is QCLed to a first CSI-RS for tracking or a first SSB, and a second subset of the one or more RS resources is QCLed to a second CSI-RS for tracking or a second SSB.

Optionally, in any of the preceding aspects, the method further comprises: determining, by the UE based on the RS measurement and a second reporting rule, a second RS resource of the one or more RS resources as a second type of resource of a second plurality of types of resources, and based thereon, generating, by the UE, a second CSI report indicating the second RS resource determined as the second type of resource; and reporting, by the UE, the second CSI report.

Optionally, in any of the preceding aspects, the first plurality of types of resources are same as or different than the second plurality of types of resources, and the first type of resource is same as or different than the second type of resource.

Optionally, in any of the preceding aspects, the second reporting rule and the first reporting rule are associated with a same CSI report configuration or different CSI report configurations.

Optionally, in any of the preceding aspects, the method further comprises: determining, by the UE based on the RS measurement and the first reporting rule, a third RS resource of the one or more RS resources as a third type of resource of the plurality types of resources; and reporting, by the UE, determination of the third RS resource as the third type of resource.

Optionally, in any of the preceding aspects, the first type of resource is same as or different than the third type of resource.

Optionally, in any of the preceding aspects, the first RS resource having a SNR value above a threshold.

Optionally, in any of the preceding aspects, the first reporting rule specifies an efficiency requirement, a CQI requirement, a signal to noise ratio (SNR) requirement, a signal to interference and noise ratio (SINR) requirement, or a rank requirement, based on which the UE determines whether a RS resource is one of the plurality of types of resources and reports a resulting determination.

Optionally, in any of the preceding aspects, the method further comprises: deriving, by the UE, a CQI value, a SNR, a SINR, or a rank value based on a selection of the first RS resource as the first type of resource, thereby generating a corresponding efficiency value; determining, by the UE, whether the efficiency value satisfies the efficiency requirement, or whether the CQI value satisfies the CQI requirement, or whether the SNR/SINR satisfies the SNR/SINR requirement, or whether the rank value satisfies the rank requirement; and upon determining that the efficiency value/CQI value/SNR/SINR/rank value satisfies the efficiency/CQI/SNR/SINR/rank requirement, respectively, determining, by the UE, the first RS resource as the first type of resource.

Optionally, in any of the preceding aspects, the CQI value, SNR, or SINR is derived based on a channel measurement (CM) on a set of CM resources and an interference measurement (IM) on a set of IM resources, wherein the set of CM resources comprises RS resources configured by a network for channel measurement and RS resources determined by the UE for channel measurement, wherein the set of IM resources comprises resources configured by the network for interference measurement and RS resources determined by the UE for interference measurement, and the resources configured by the network for interference measurement comprise NZP CSI-RS resource(s) for interference measurement and/or CSI interference measurement (CSI-IM) resource(s).

Optionally, in any of the preceding aspects, the efficiency requirement specifies an efficiency/CQI/SNR/SINR/rank threshold range, or an efficiency/CQI/SNR/SINR/rank threshold, or a ranking of an efficiency/CQI/SNR/SINR.

According to another aspect of the present disclosure, an apparatus is provided for performing any of the preceding aspects. The apparatus includes: a non-transitory memory storage comprising instructions; and one or more processors in communication with the memory storage, wherein the instructions, when executed by the one or more processors, cause the apparatus to perform any of the preceding aspects.

According to another aspect of the present disclosure, a method is provided that includes: configuring, by a base station (BS), one or more RS resources for a user equipment (UE); transmitting, by the BS to the UE, reference signals (RSs) on the one or more RS resources; and receiving, by the BS from the UE in response to transmitting the RSs, a channel state information (CSI) report that is based on the RSs transmitted to the UE on the one or more RS resources, the CSI report comprising a first RS resource of the one or more RS resources, and the CSI report indicating that the first RS resource is determined by the UE to be a first type of resource of a plurality types of resources.

Thus a UE is able to determine or select a type of a RS resource from RS resource configured by the base station, and report the determination or selection to the base station, which facilitates the base station to perform link adaptation for communication with the UE and other UEs.

Optionally, in any of the preceding aspects, the CSI report comprises a first channel quality indicator (CQI) value derived associated with the first RS resource determined as the first type of resource.

Optionally, in any of the preceding aspects, the one or more RS resources comprise one or more ports, and each RS resource comprises one or more ports.

Optionally, in any of the preceding aspects, the one or more RS resources are configured for the UE as a NZP CSI-RS resource setting, a NZP CSI-RS resource set, or a NZP CSI-RS resource.

Optionally, in any of the preceding aspects, at least one port, one of the one or more RS resources, the NZP CSI-RS resource setting, the NZP CSI-RS resource set, or the NZP CSI-RS resource is configured for the UE as a UE-determined measurement resource.

Optionally, in any of the preceding aspects, the plurality types of resources comprises a resource for channel measurement, a resource for interference measurement, a zero-power resource, and a muting resource.

Optionally, in any of the preceding aspects, the first type of resource is a resource for channel measurement, a resource for interference measurement, a zero-power resource, or a muting resource.

Optionally, in any of the preceding aspects, the one or more RS resources are quasi co-located (QCLed) to a same channel state information-reference signal (CSI-RS) for tracking or a same synchronization signal block (SSB).

Optionally, in any of the preceding aspects, a first subset of the one or more RS resources is QCLed to a first CSI-RS for tracking or a first SSB, and a second subset of the one or more RS resources is QCLed to a second CSI-RS for tracking or a second SSB.

Optionally, in any of the preceding aspects, the CSI report further comprises a second RS resource of the one or more RS resources determined by the UE as a second type of resource of the plurality of types of resources.

Optionally, in any of the preceding aspects, the first type of resource is same as or different than the second type of resource.

Optionally, in any of the preceding aspects, the first RS resource corresponds to a first reporting rule, and the second RS resource corresponds to a second reporting rule different than the first report rule, wherein the first reporting rule and the second reporting rule specify requirements for the UE to determine whether a RS resource is one of the plurality of types of resources and to report a resulting determination.

Optionally, in any of the preceding aspects, the first reporting rule and the second reporting rule specify different efficiency requirements, different signal noise ratio (SNR) requirements, different signal interference and noise ratio (SINR) requirements, or different rank requirements.

Optionally, in any of the preceding aspects, the method further comprises: transmitting, by the BS to the UE, information of the first reporting rule and/or the second reporting rule.

According to another aspect of the present disclosure, an apparatus is provided for performing any of the preceding aspects. The apparatus includes: a non-transitory memory storage comprising instructions; and one or more processors in communication with the memory storage, wherein the instructions, when executed by the one or more processors, cause the apparatus to perform any of the preceding aspects.

According to another aspect of the present disclosure, a system is provided for performing any of the preceding aspects. The system includes a user equipment (UE) and a base station.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates a diagram showing example SS bursts embedded with PDSCH;

FIG. 4 illustrates a diagram showing example PDCCH, PDSCHs and DMRSs multiplexed for more than one UE;

FIG. 5 illustrates a diagram showing examples non-zero power (NZP) CSI-RSs multiplexed with PDSCH and for one or more UEs;

FIG. 14 illustrates a CQI table as specified in a 3GPP TS;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Conventionally, reference signals (RSs), e.g., channel state information-RSs (CSI-RSs), may be transmitted in measurement resources to UEs for measurement of downlink channels between the UEs and TRPs. The network may specify to the UEs which of the measurement resources is for channel measurement (CM), and which is for interference measurement (IM). Since the impact of a serving signal, interfering signal, or muting signal on a resulting UE measurement, e.g., a signal interference and noise ratio (SINR), channel quality indicator (CQI) or efficiency, may generally be more accurately estimated by the UE, instead of by the network, it is desirable for a UE to be able to determine or select whether a measurement resource is for CM or IM, or muting.

In the embodiments of the present disclosure, a UE is configured with RS resources for CSI measurement and reporting, however, the network does not specify whether the configured RS resources are for CM, IM or muting. Instead, a UE determines whether a RS resource is for CM or IM, or muting, i.e., determine what type of resource that the RS resource is. A type of resource may be a resource for CM, a resource for IM, a zero-power resource, or a muting resource. The UE performs measurement on RSs transmitted on the RS resources, and determines and reports a type for a RS resource based on a reporting rule. Details will be provided in the following.

Figure 1:
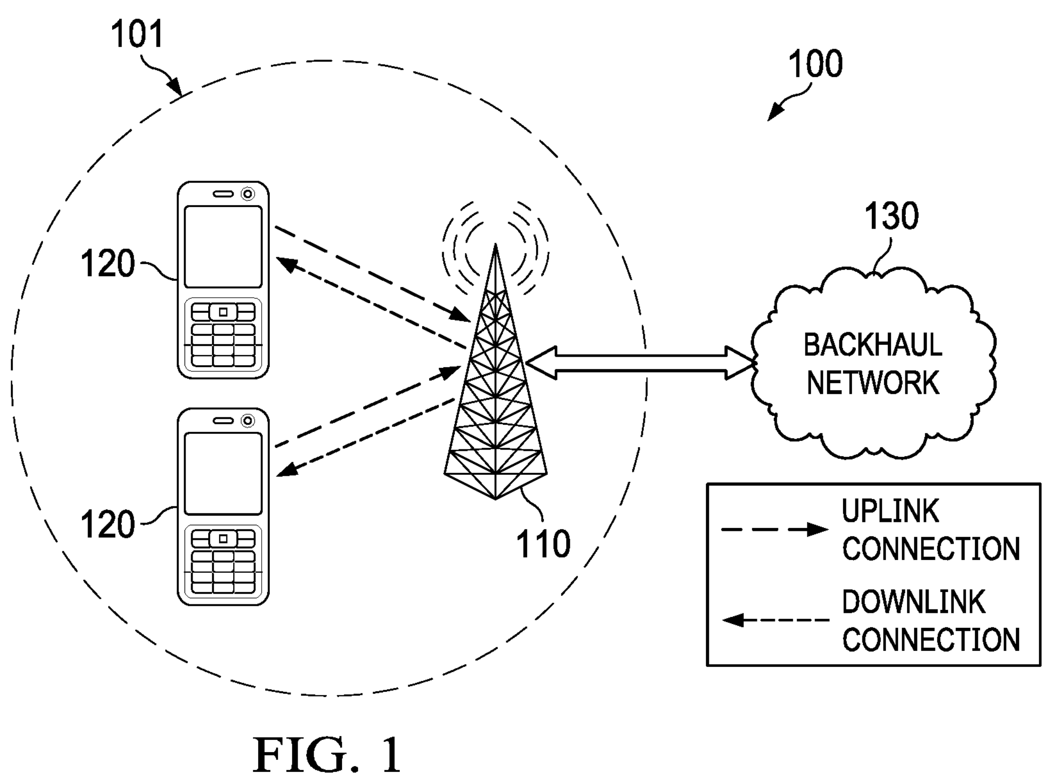
FIG. 1 illustrates a diagram of an example wireless communication system.

FIG. 1 illustrates an example wireless communication system 100. Communication system 100 includes a base station 110 with coverage area 101. The base station 110 serves a plurality of user equipments (UEs), including UEs 120. Transmissions from the base station 110 to a UE is referred to as a downlink (DL) transmission and occurs over a downlink channel (shown in FIG. 1 as a short-dashed arrowed line), while transmissions from a UE to the base station 110 is referred to as an uplink (UL) transmission and occurs over an uplink channel (shown in FIG. 1 as a long-dashed arrowed line). Data carried over the uplink/downlink connections may include data communicated between the UEs 120, as well as data communicated to/from a remote-end (not shown) by way of a backhaul network 130. Services may be provided to the plurality of UEs by service providers connected to the base station 110 through the backhaul network 130, such as the Internet. The wireless communication system 100 may include multiple distributed access nodes 110.

In a typical communication system, there are several operating modes. In a cellular operating mode, communications to and from the plurality of UEs go through the base station 11*o*, while in device to device communications mode, such as proximity services (ProSe) operating mode, for example, direct communication between UEs is possible. As used herein, the term "base station" refers to any component (or collection of components) configured to provide wireless access to a network. Base stations may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, access nodes, access points, transmission points (TPs), transmission-reception points (TRPs), cells, carriers, macro cells, femtocells, pico cells, relays, customer premises equipment (CPE), the network side, the network, and so on. In the present disclosure, the terms "base station" and "access node" are used interchangeably. As used herein, the term "UE" refers to any component (or collection of components) capable of establishing a wireless connection with a base station. UEs may also be commonly referred to as mobile stations, mobile devices, mobiles, terminals, user terminals, users, subscribers, stations, communication devices, CPEs, relays, Integrated Access and Backhaul (JAB) relays, and the like. It is noted that when relaying is used (based on relays, picos, CPEs, and so on), especially multi-hop relaying, the boundary between a controller and a node controlled by the controller may become blurry, and a dual node (e.g., either the controller or the node controlled by the controller) deployment where a first node that provides configuration or control information to a second node is considered to be the controller. Likewise, the concept of UL and DL transmissions can be extended as well.

A cell may include one or more bandwidth parts (BWPs) for UL or DL allocated for a UE. Each BWP may have its own BWP-specific numerology and configuration, such as the BWP's bandwidth. It is noted that not all BWPs need to be active at the same time for the UE. A cell may correspond to one carrier, and in some cases, multiple carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL, or simply UL) carrier which has an associated DL, and other carriers are called supplementary UL (SUL) carriers which do not have an associated DL. A cell, or a carrier, may be configured with slot or subframe formats comprised of DL and UL symbols, and that cell or carrier is seen as operating in a time division duplexed (TDD) mode. In general, for unpaired spectrum, the cells or carriers are in TDD mode, and for paired spectrum, the cells or carrier are in a frequency division duplexed (FDD) mode. A transmission time interval (TTI) generally corresponds to a subframe (in LTE) or a slot (in NR). Access nodes may provide wireless access in accordance with one or more wireless communication protocols, e.g., long term evolution (LTE), LTE advanced (LTE-A), 5G, 5G LTE, 5G NR, future 5G NR releases, 6G, High Speed Packet Access (HSPA), Wi-Fi 802.11a/b/g/n/ac, etc. While it is understood that communication systems may employ multiple access nodes (or base stations) capable of communicating with a number of UEs, only one access node, and two UEs are illustrated in FIG. 1 for simplicity.

Conventionally, a channel between two devices is estimated by having a first device transmit a known signal on a known time or frequency resource (s) to a second device, the received signal at the second device is expressible as:

$$y=Hs+n, \tag{1}$$

where y is the received signal at the second device, s is the known signal (which may be a reference signal, a pilot, or a pilot signal), H is the channel model or channel impulse response (CIR), and n is the noise (and interference for some communication channels). In a MIMO system, where there are $N_{tx}$ transmit antennas and $N_{rx}$ receive antennas, H is a $N_{rx}\times N_{tx}$ matrix. Because s is known by the second device, it is possible for the second device to determine or estimate H from y. Accordingly, a base station may transmit reference signals s to a UE, and the UE may estimate the channel H, and feed back CSI information based on the estimated H to the base station.

Figure 2:
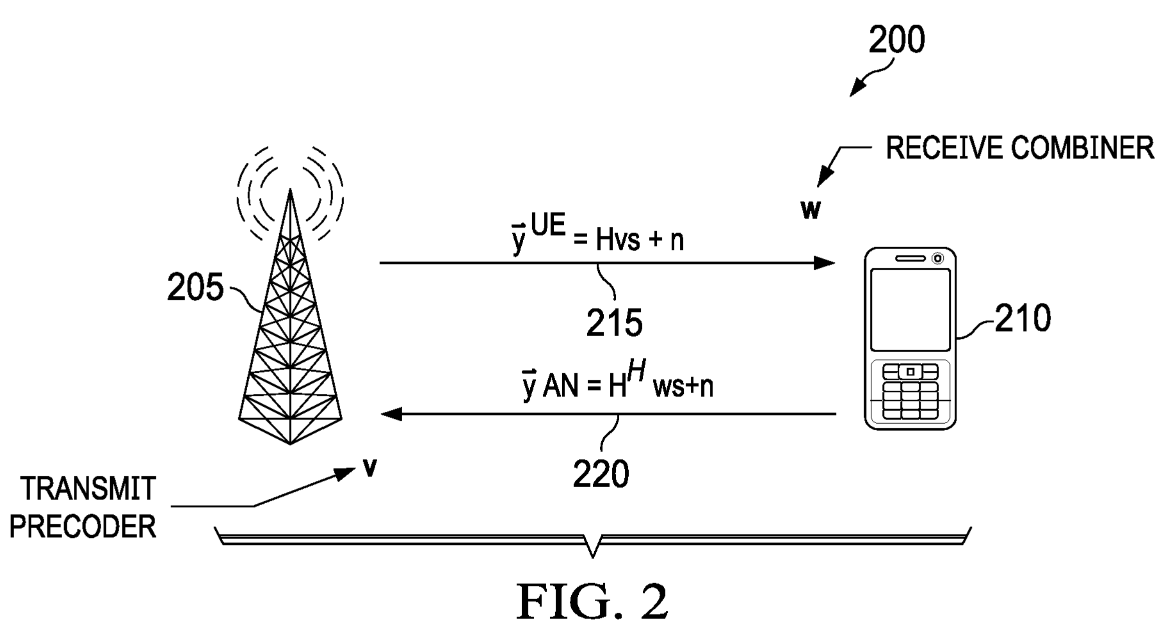
FIG. 2 illustrates a diagram of an example communication system, providing mathematical expressions of signals transmitted in the communication system.

FIG. 2 illustrates an example communication system 200, providing mathematical expressions of signals transmitted in the communication system. Communication system 200 includes an access node 205 communicating with a UE 210. As shown in FIG. 2, access node 205 is using a transmit filter v and UE 210 is using a receive filter w. Both access node 205 and UE 210 use linear precoding or combining. Assuming H is $N_{rx}\times N_{tx}$ matrix of a multiple-input multiple-output (MIMO) system, i.e., there are $N_{tx}$ transmit antennas and $N_{rx}$ receive antennas. The transmit filter v of dimension $N_{tx}\times Ns$ enables the transmitter to precode or beamform the transmitted signal, where Ns is the number of layers, transmission ports, (transmission virtualized or physical) antenna ports, streams, symbols, pilots, messages, data, or known sequences transmitted. The receive filter w of multi-antenna systems is of dimension $N_{rx}\times Ns$ and represents the combining matrix, which is usually applied on the received signal y according to $w^H y$. The above description is for a transmission from access node 205 to UE 210, i.e., a DL transmission. The transmission may also occur at the reverse direction (an UL transmission), for which the channel matrix becomes $H^H$ in the case of TDD (where $H^H$ is the Hermitian of channel model H), and w may be seen as the transmit filter and v as the receiver filter. The w for transmission and the w for reception may or may not be the same, and likewise for v.

A DL (or forward) channel 215 between access node 205 and UE 210 has channel model or response H, while an UL (or backward, or reverse) channel 220 between UE 210 and access node 205 has channel model or response $H^H$. (Another convention is that the UL channel is denoted as $H^T$, which is the transposition of channel model H.) Although FIG. 2 depicts only one access node and one UE, the communication system 200 is not limited to this case. Multiple UEs may be served by the access node, on different time-frequency resources (such as in frequency division multiplexed-time division multiplexed (FDM-TDM) communication systems, as in typical cellular systems) or on the same time-frequency resources (such as in multi-user MIMO (MU-MIMO)) communication systems, wherein multiple UEs are paired together and transmissions to each UE are individually precoded). Among the paired UEs, there is intra-cell interference, also known as MU interference (MUI).

Multiple access nodes may also exist in the network, some of which may be cooperatively serving UE 210 in a joint transmission fashion (such as in coherent joint transmission, non-coherent joint transmission, coordinated multipoint transmission, etc.), a dynamic point switching/selection (DPS) fashion, and so on. Some other access nodes may not serve UE 210 and their transmissions to their own UEs cause inter-cell interference to UE 210. The scenario of multiple access nodes and multiple UEs, with access node cooperation to serve a UE and with MU-MIMO, is an example scenario considered herein.

Multiple physical layer channels and signals for one or more UEs may be multiplexed. These physical layer channels and signals include primary synchronization signal/secondary synchronization signal (PSS/SSS), physical broadcast channel (PBCH) and its associated demodulation reference signal (DMRS), physical downlink shared channel (PDSCH) and its associated DMRS and PT-RS, physical downlink control channel (PDCCH) and its associated DMRS, and channel state information-reference signal (CSI-RS) which further include those used, for CSI acquisition, for beam management, and for tracking (which is also called tracking reference signal (TRS)). FIG. 3 illustrates a diagram 300 showing SS bursts that are embedded, i.e., multiplexed, with PDSCH around the SS bursts. FIG. 4 illustrates a diagram 400 showing PDCCH, PDSCHs and DMRSs multiplexed for more than one UE. As shown, PDCCH 402 includes scheduling information of PDSCH1 404 for UE1 and PDSCH2 406 for UE2. FIG. 4 also shows respective DMRSs 412-416 for the PDCCH 402, PDSCH1 404 and PDSCH2 406. FIG. 5 illustrates a diagram 500 showing examples of non-zero power (NZP) CSI-RSs used for channel estimation, interference measurement, and so on, which are multiplexed with PDSCH and for one or more UEs. NZP CSI-RS is also sometimes loosely referred to as just CSI-RS. However, zero-power (ZP) CSI-RS is also supported in LTE and NR.

These downlink channels and signals may be transmitted using beamforming for high frequency bands. The beams used for these channels and signals can be semi-statically configured, such as for PDCCH per control resource set (CORESET) via type-D QCL (i.e., quasi-collocation in term of spatial receiver filter) in TCI (transmission configuration indication) state, or dynamically indicated via TCI in DCI (downlink control information), such as in the case of PDSCH. Beam sweeping may be employed to sweep a set of narrower beams over a wider angular direction for beam management as in the case of SS/PBCH blocks or beam management CSI-RS resources. It is clear then that multiple beams of various spatial directions, beamforming gains, and beam-widths/shapes may be multiplexed.

Figure 6:
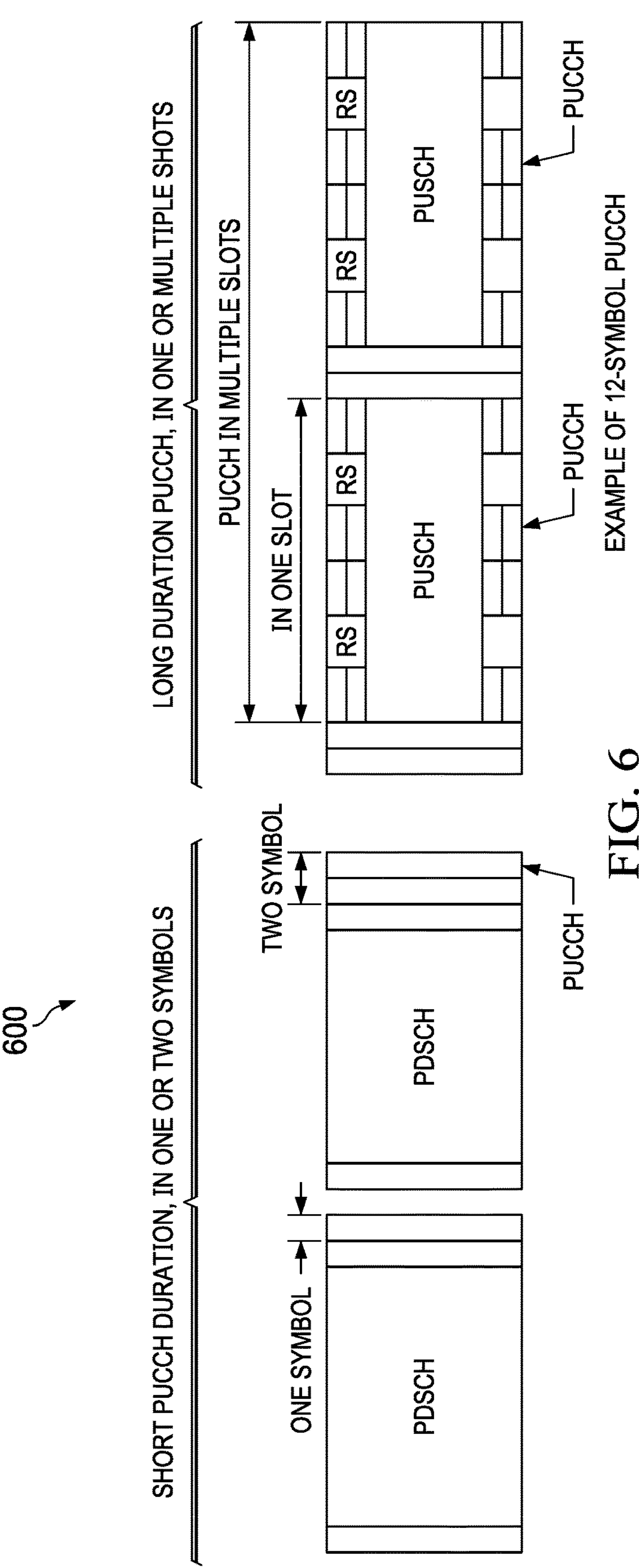
FIG. 6 illustrates a diagram showing examples of PDSCH/PUCCH multiplexing, and PUCCH/PUSCH/DMRS multiplexing.

If a TRP multiplexes served UEs in a TDM manner, uplink channels and signals may also be multiplexed which include physical uplink shared channel (PUSCH) and its associated DMRS and PT-RS, physical uplink control channel (PUCCH) and its associated DMRS, physical random access channel (PRACH) signal, and sounding reference signal (SRS). FIG. 6 illustrates a diagram 600 showing examples of PDSCH/PUCCH multiplexing, and PUCCH/PUSCH/DMRS multiplexing.

Figure 7:
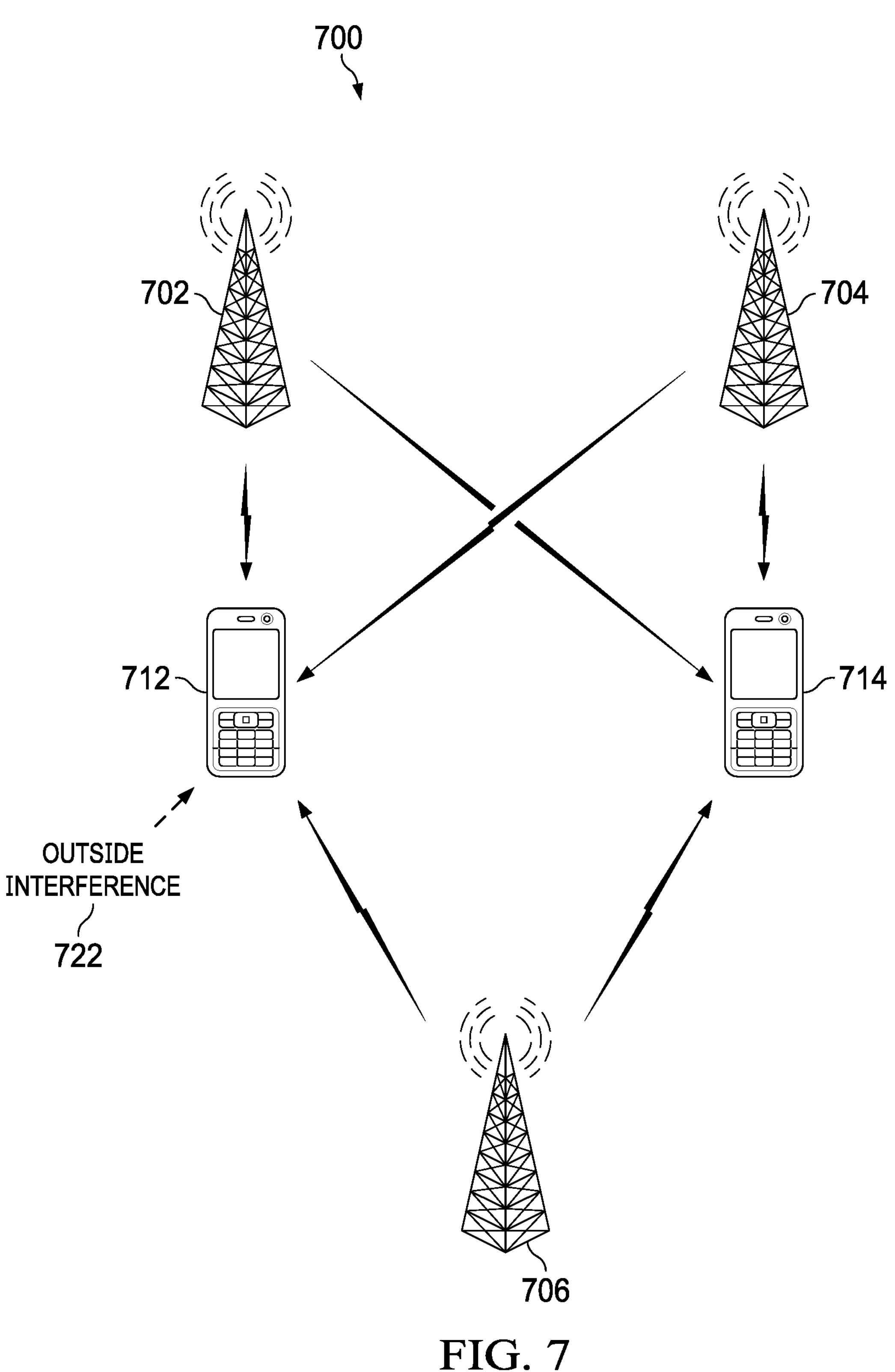
FIG. 7 illustrates a diagram of an example communication network including multiple TRPs serving multiple UEs with MU-MIMO.

FIG. 7 illustrates a diagram of another example communication network 700 including multiple TRPs serving multiple UEs with MU-MIMO. The communication network 700 includes TRPs 702, 704 and 706, each of which serves UEs 712 and 714. FIG. 7 shows that the communication network 700 includes three TRPs and two UEs merely for illustrative purposes, and the communication network 700 may include more or less TRPs or UEs than what is illustrated. A downlink signal y received at the UE 712 may be expressed as:

$$y=H_0S_0+H_1S_1+H_2S_2+I0, \quad (2)$$

where $S_0$, $S_1$, and $S_2$ are respective signals transmitted by the TRPs 702, 704 and 706, $H_0$, $H_1$ and $H_2$ represent respective channels between the TRP 702 and the UE 712, between the TRP 704 and the UE 712, and between the TRP 706 and the UE 712. I0 represents noise plus interference from outside of the illustrated TRPs/UEs.

Each of the TRPs 702, 704 and 706 and each of the UEs 712 and 714 may form a TRP-UE pair. Within each TRP-UE pair, the relationship between the TRP and the UE may be serving, interfering and/or muting. For example, when the TRP 702 is serving the UE 712, the relationship between the TRP 702 and the UE 712 is serving. A TRP not serving the UE 712 may cause downlink interference for the UE 712. For example, downlink transmission from the non-serving TRP 704 (e.g., from the TRP 704 to the UE 714) may interfere with transmission from the TRP 702 by creating downlink interference with the UE 712. In this case, the TRP 704 is called an interferer of the UE 712, and the relationship between the TRP 704 and the UE 712 is interfering. That is, the portion of $H_1S_1$ in above equation (2) becomes interference to the UE 712. It is noted that an outside interference 722, which is part of I0 in equation (2), such as interference caused by a TRP not illustrated in the figure but transmitting to some other UE, or any other transmission/emission from any source on the same time/frequency resources, may also cause downlink interference with the UE 712. Similarly, the TRP 706 may also be an interferer of the UE 712. Alternatively, the relationship between the TRP 706 and the UE 712 may be muting (or blanking, or non-serving non-interfering) when the TRP 706 is muted (i.e., has no communication) on the time-frequency resources for the communication of the UE 712 with the TRP 702.

Conventionally, reference signals (RSs), e.g., CSI-RSs, may be transmitted, in measurement resources, to UEs, e.g., the UE 712, for measurement of downlink channels between the UEs and the TRPs, e.g., the channel model H illustrated in FIG. 2. The UEs may be configured with information indicating/specifying which of the measurement resources is for channel measurement (CM), and which is for interference measurement (IM). In an example, the measurement resources may include one or more RS resources and one or more channel state information (CSI)-interference measurement (CSI-IM) resources. Measurement resources configured for CM is referred to as channel measurement resources (CMRs). Measurement resources configured for IM is referred to as interference measurement resources (IMRs), such as the CSI-IM. The UEs perform CM and IM accordingly based on the measurement resources, and generate channel state information (CSI) reports, based on which the network performs LA for the UEs and communicates with the UEs. NZP CSI-RS resources may be configured for CM and IM, whereas ZP CSI-RS resource or CSI-IM (CSI interference measurement) resources may be configured for IM. Each NZP CSI-RS resource comprises a number of ports on some resource elements. Each ZP CSI-RS resource or CSI-IM generally comprises 4 resource elements. One or more such ZP CSI-RS resources and/or NZP CSI-RS resources may be configured as a CSI-RS resource set or CSI-IM resource set. One or several such resource sets may be configured as a CSI resource setting (aka. CSI resource configuration).

On an NZP CSI-RS resource that is for CM, a UE may assume its desired signal(s) is transmitted. That is, the NZP CSI-RSs to be used by the UE for CM is transmitted over the NZP CSI-RS resource according to network configuration/indication, including, for example, scrambling ID, layers/ports, CDM, $P_c$ ('powerControlOffset', or EIRP ratio between an NZP layer energy on an RE and PDSCH energy on an RE), etc.

On NZP CSI-RSs for IM, the serving cell may mute (in which case the serving cell configures/transmits a ZP CSI-RS to the served UE) or may not mute, while the interferers (which may be the same cell as the serving cell or a different cell than the serving cell) transmit on one of the NZP CSI-RSs (in which case the cell configures/transmits a NZP CSI-RS) and mutes on the other (in which case the cell configures/transmits a ZP CSI-RS). In this case, the UE assumes no serving signal is transmitted on the NZP CSI-RS for IM or removes the serving signal if the NZP CSI-RS for IM overlaps with a CMR, and an interference signal(s) is transmitted on the NZP CSI-RS for IM. If NZP CSI-RS interfering signal information is signaled to the UE, such as scrambling ID, layers/ports, CDM, $P_c$, such information can also be assumed by the UE (e.g., similar assumptions as CM NZP CSI-RS signal but the assumptions are for IM instead). In certain embodiments, no other assumption is made by the UE regarding the interference signal. In certain embodiments, if any of above information is not signaled to the UE, the UE does not make the associated assumption for IM.

Figure 8:
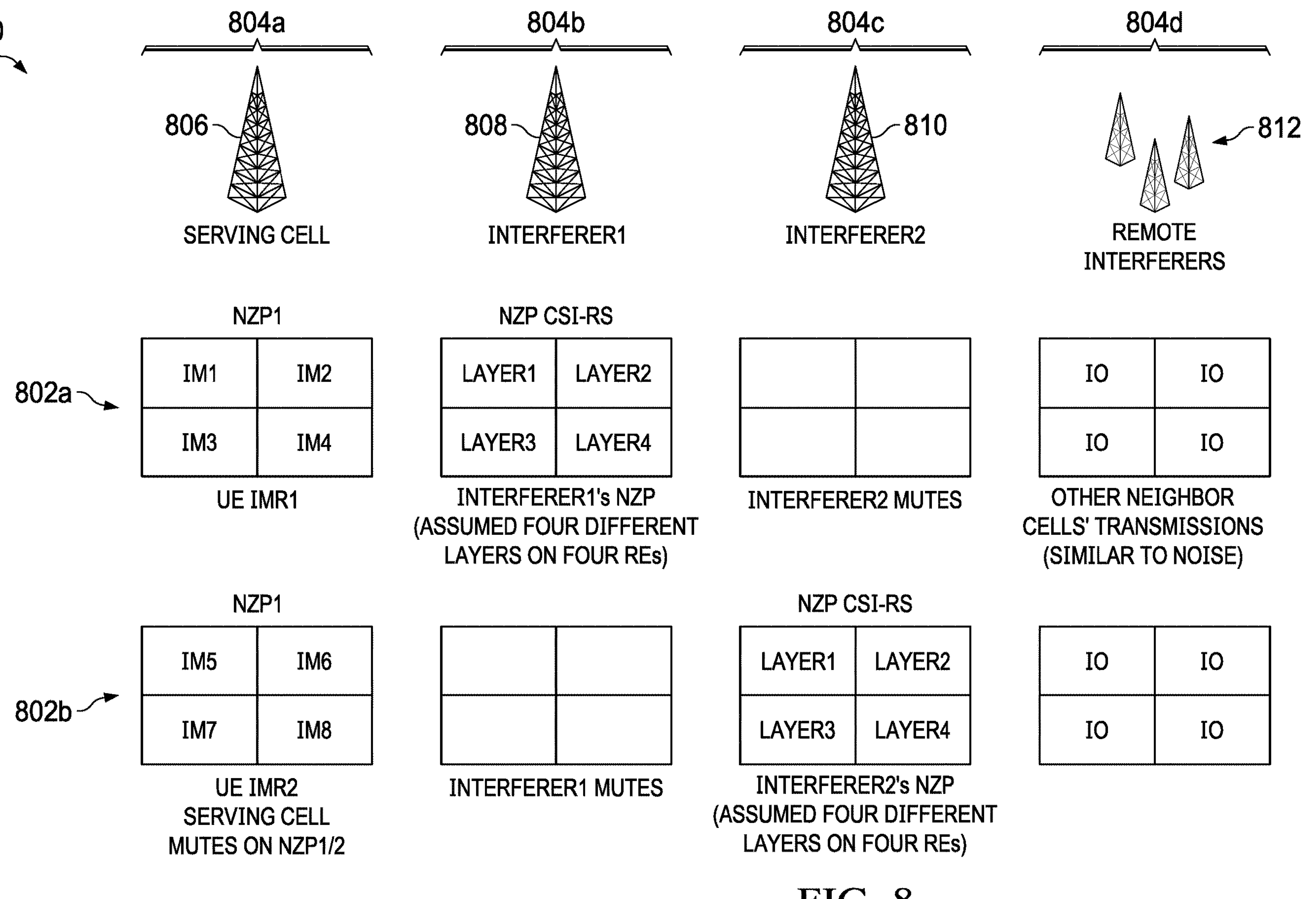
FIG. 8 illustrates a diagram of an embodiment interference measurement (IM) performed based on multiple NZP CSI-RSs on IM resources.

FIG. 8 illustrates an example 800 of IM performed based on multiple NZP CSI-RSs on IMRs not overlapped with a CMR, according to certain embodiments of this disclosure. Two NZP CSI-RSs for IM are illustrated in this example (a first corresponds to row 802*a* and a second corresponds to row 802*b*). FIG. 8 shows four columns 804 (column 804*a*, column 804*b*, column 804*c*, and column 804*d*) from perspectives of a serving cell 806, interferer 1808, interferer 2 81*o*, and a plurality of remote interferers 812, respectively.

Figure 9:
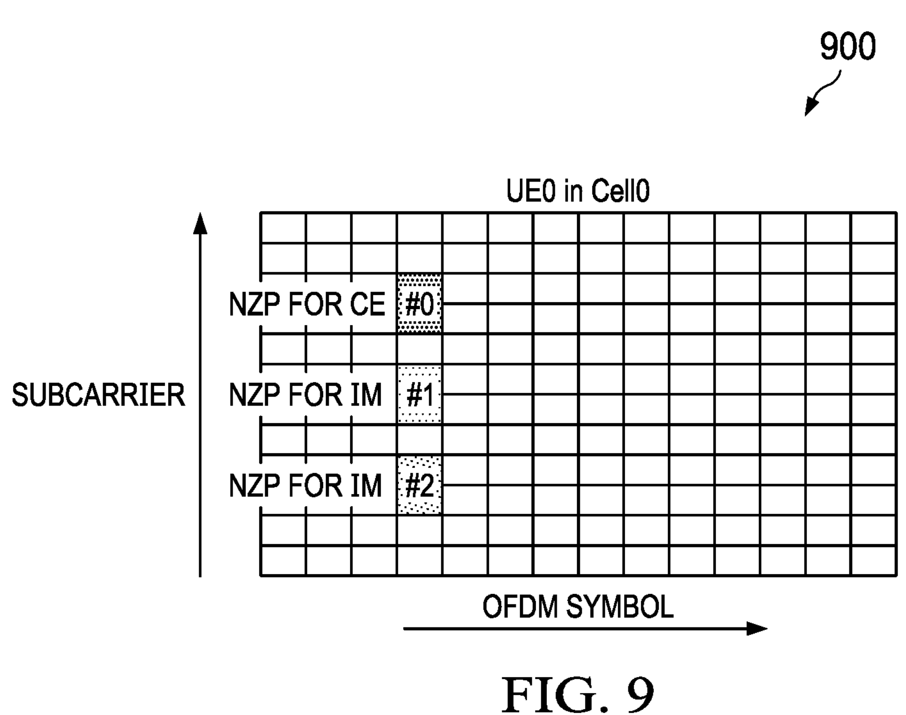
FIG. 9 illustrates a diagram of embodiment non-overlapped CSI-RS resources configured for channel and interference measurement.

FIG. 9 illustrates an example use case 900 of non-overlapped CSI-RS resources configured for channel and interference measurement, according to certain embodiments of this disclosure. From a UE0's perspective, NZP CSI-RS resource #0 is for CM, while NZP CSI-RS resource #1 and #2 for IM. When a base station emulates potential MU signals on the NZP CSI-RS resources #1 and #2, the UE0 may probe MU-interference by measuring interference on these two IM resources.

Figure 10:
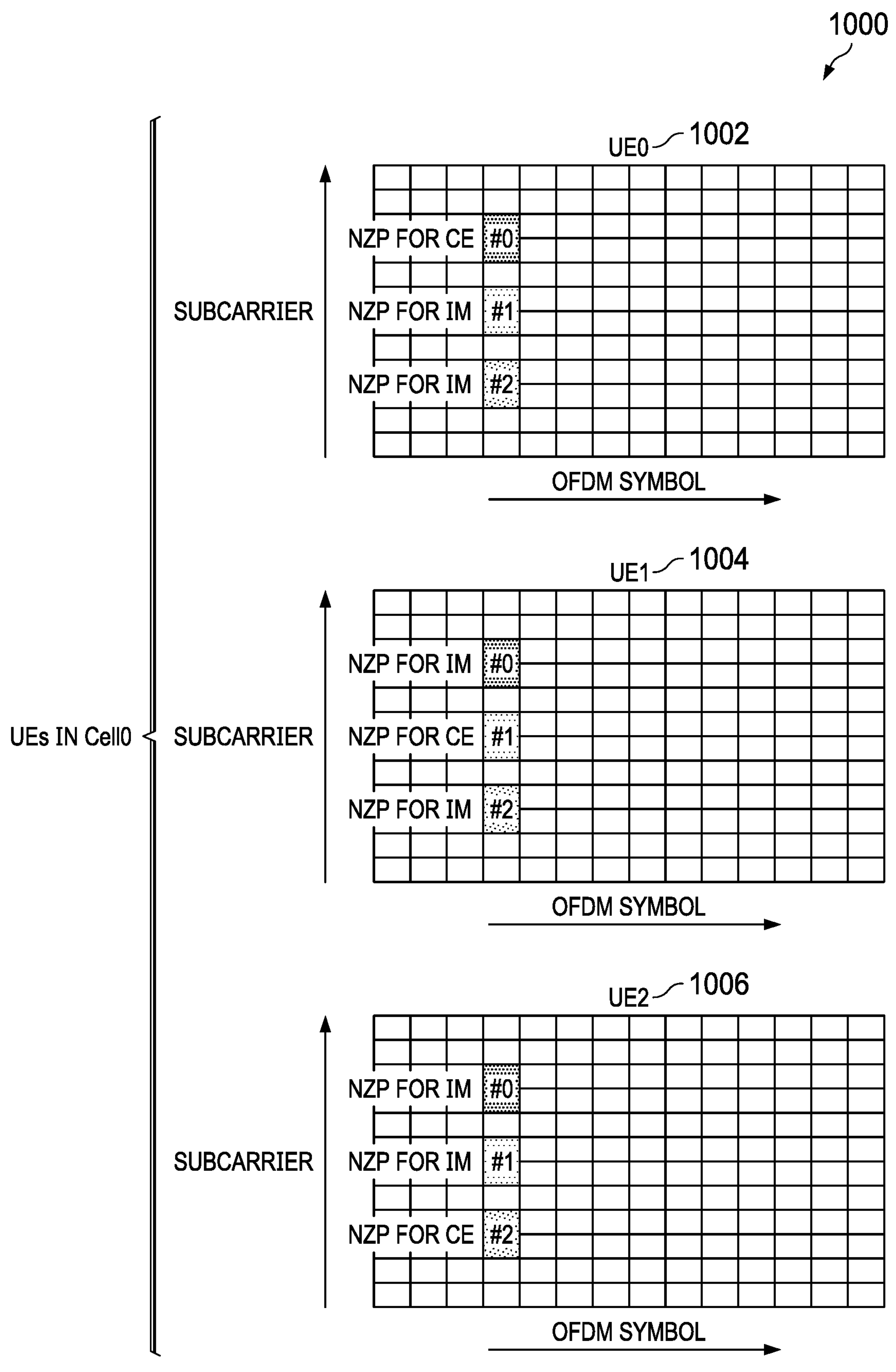
FIG. 10 illustrates a diagram of an embodiment configuration of NZP CSI-RS resources.

FIG. 10 illustrates an example configuration 1000 of a set of NZP CSI-RS resources, according to certain embodiments of this disclosure. Taking non-overlapped CSI-RS resources as an example, in cello, NZP CSI-RS resource #0, #1, and #2 are assigned to UE0 (shown at 1002), UE1 (shown at 1004) and UE2 (shown at 1006), respectively, for channel measurement. For each UE, the other two CSI-RS resources, except for the CSI-RS resource for CM, are IMRs.

Interference measurement and mitigation has been a challenging issue in wireless communications. Interferences are dynamic, unpredictable, and uncontrollable in most cases, and may be generally limited by causality in measurement-reporting-scheduling of communications. For example, in the example illustrated with respect to FIG. 7, the downlink interference caused by the TRP 704 to the UE 712 may only occur when the TRP 704 perform downlink transmission to a UE served by the TRP 704. The downlink transmission from the TRP 704 occurs on a time-frequency resource depending on traffic load/traffic burst of the UE served by the TRP 704 and a TRP scheduling outcome. As the traffic bursts and the scheduling outcome are generally quite random and may differ from one TTI to the next and differ from one PRB to the next, the downlink interferences created by the TRP 704 are generally quite bursty and random in nature. The total (sum) interferences from a large number of interferers (esp. non-dominant interferers) may appear less bursty, but if there exists a small number of dominant interferers, the interference appears to be "on/off" interference, e.g., high in one TTI but vanished in the next. It is noted that wireless channels may experience fading over time, however, the channels are relatively stable in both small (e.g., milliseconds, within the duration of a block fading) time scale and long (e.g., seconds and longer) time scale. Comparatively, interferences (especially on/off interference) are more dynamic and variable than the channels. Tracking and estimating the channels with reasonable accuracy may be feasible, but tracking the interferences in an uncoordinated network is very challenging. It is desirable to develop mechanisms for interference measurement and mitigation with improved performance, which is beneficial for achieving good link adaptation (LA) performance.

Probing has been used to circumvent the predictability issue of interference measurement by adding an extra step of pre-scheduling. In an example of probing, a selected UE may be configured to measure on probing resources for signals and/or interferences (e.g., CMRs and/or IMRs), and reports channel quality indicator/radio resource management/radio link management (CQI/RRM/RLM) measurement. The network thus may predict the system impact and/or performance based on the measurements on a smaller scale of resources. The measurements related to the prediction may be made in parallel with the network's normal operations without affecting the network's normal operations. The probing step is after the network (pre-)scheduling and before the PDSCH transmission. In some TDD systems, rather than relying on DL CMRs/IMRs for probing, UL SRS may be transmitted after the network (pre-)scheduling and before the PDSCH transmission, in which the UL SRS is transmitted according the scheduling results, i.e., using the same frequency-domain resource allocation and ports/layers for the PDSCH transmission. The UL SRS based probing is a variant of BiT (bi-directional training). A price to pay for probing is the additional latency due to the introduced probing operation.

However, the probing technique may not be suitable for ultra reliable low latency communication (URLLC), which generally requires high reliability (e.g., 10^-5 BLER) and low latency (e.g., a few milliseconds). The low latency requirement of URLLC traffic may not allow sufficient time for probing. Conventional techniques, such as outer loop link adaptation (OLLA), DL probing, or BiT/UL probing, are not suitable for URLLC due to the high reliability requirement and the low latency requirement of URLLC. Thus, interference measurement and mitigation and link adaptation are more challenging for URLLC.

Discussions have been made and solutions have been proposed regarding interference measurement, especially for URLLC. A reactive way is to provide more information about the interferences, e.g., interference statistics, to the network to facilitate interference measurement and mitigation by the network. A proactive way is to coordinate or control interferences to reduce and eliminate uncertainty in interferences during scheduling. This may be possible because tracking serving channel(s) and dominant interfering channel(s) in a coordinated network is feasible.

Embodiments of the present disclosure provide methods for interference measurement, generally following the proactive way above. In some embodiments, a network coordinates a number of potential signal-interference combinations "offline" among dominant interferers and sends RSs over RS resources, among all the CSI measurement resources for the UE. UEs perform channel state information (CSI) measurements on the measurement resources and CSI reporting of the CSI measurements. The UEs also determine which of the RS resources are for CM, for IM and/or muting (blanking, non-serving non-interfering) resources, e.g., based on certain criteria/requirement (such as a threshold signal interference and noise ratio (SINR)), and report the determinations in the CSI reporting. When URLLC traffic arrives, the network selects, based on the CSI reporting, resources for link adaptation (LA) and downlink transmissions.

Figure 11:
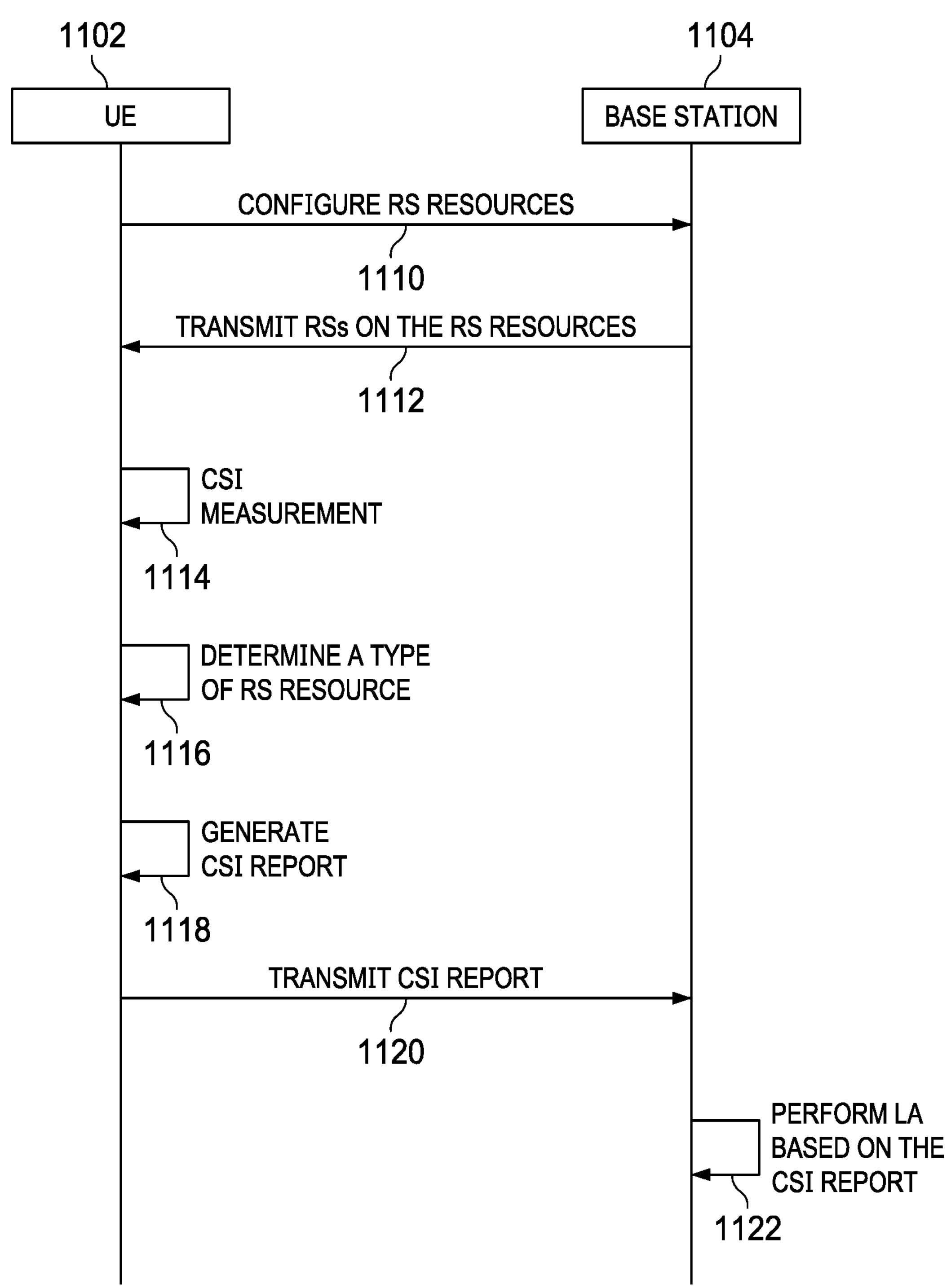
FIG. 11 illustrates a diagram of an embodiment interference measurement method.

FIG. 11 illustrates a diagram of an embodiment method for interference measurement. A base station 1104 configures a UE 1102 with a set of RS resources (e.g., among the measurement resources for the UE) for CSI measurement and reporting (step 1110). However, in this example, the base station 1104 does not specify or indicate whether each of the set of RS resources is for CM, or IM, or muting (or does not specify which of the set of RS resources is for CM, which is for IM, and which is muting resources). This will be determined/selected by the UE 1102. The set of RS resources may include periodic (P) or semi-persistent (SP) RS resources. The set of RS resources may include CSI-RS resources. The set of RS resources may include a plurality of ports, and each RS resource may include one or more ports. The set of RS resources may be configured in terms of a NZP CSI-RS resource setting, a NZP CSI-RS resource set, or a NZP CSI-RS resource (i.e., the configuration granularity is a resource). The set of RS resources may be quasi co-located (QCLed) to a same channel state information-reference signal (CSI-RS) for tracking or a same synchronization signal block (SSB). In some embodiments, a first subset of the set of RS resources is QCLed to a first CSI-RS for tracking or a first SSB (which may implicitly indicate that the first subset is from a first TRP), and a second subset of the set of RS resources is QCLed to a second CSI-RS for tracking or a second SSB (which implicitly indicate that the second subset is from a second TRP). The base station 1104 may configure that at least one port of the set of RS resources, at least one RS resource of the set of RS resources, or the NZP CSI-RS resource setting, or the NZP CSI-RS resource set, or the NZP CSI-RS resource is configured for the UE as a UE-determined measurement resource. That is, the UE 1102 is configured to determine a type of the UE-determined measurement resource, e.g., whether it is a resource for CM, for IM, or is a muting resource.

In some embodiments, a plurality of types (or categories, classes, groups) of resources may be defined. The plurality of types of resources may include a type of RS resource for CM (i.e., CMR), a type of RS resource for IM (i.e., IMR), and a type of zero-power (ZP) resource or muting resource (i.e., muting). Other types of resource may also be included depending on specific applications. The types of resources may be viewed as categories, e.g., represented as {CMR, IMR, muting}, {CMR, IMR}, or {CMR, muting}, and so on. The UE 1102 may be configured to determine whether a RS resource of the set of RS resources is categorized (or grouped, or classified, or selected) into any one of the plurality of types of resources (i.e., any of the categories), and report a determination result to the base station 1104. In other words, the UE 1002 selects a RS resource from the RS resources as a specific type of resource, e.g., as a resource for CM, IM or muting.

The base station 1104 transmits RSs on the set of resources to the UE 1102 (step 1112). The RSs may include (NZP) CSI-RSs, synchronization signals (SSs), tracking RSs (TRSs, CSI-RSs for tracking), and/or other applicable RSs. The UE 1102 receives the RSs transmitted from the base station 1104, and performs CSI measurements on the RSs (step 1114). The UE 1102 may perform the CSI measurements and generate reporting quantities as conventionally known in the art.

The UE 1102 may determine a type for a RS resource of the set of RS resources (step 1116) based on the measurements on the resources. That is, the UE 1102 determines whether the RS resource is for CM, for IM or for muting based on the measurements. A RS resource that is determined as a resource for CM is assumed by the UE as a CMR, and a RS transmitted on the RS resource may be assumed by the UE as a serving signal (referred to as "S"), for example, each port of a CMR corresponds to a serving signal transmission layer. A RS resource that is determined as a resource for IM is assumed by the UE as a NZP-IMR, and a RS transmitted on the RS resource may be assumed by the UE as an interfering signal (referred to as "I"), for example, each port of a NZP-IMR corresponds to an interference signal transmission layer. A RS resource may be determined as a muting resource or ZP resource, (in an embodiment when it is not determined by the UE 1102 as a CMR or an IMR, it by default becomes a muting/ZP resource), and a RS transmitted on the RS resource may be referred to as a muting signal (referred to as "M"), which is assumed by the UE as neither a serving signal nor an interference signal. Since the RS resources carry corresponding RSs, the categories {CMR, IMR, muting} may also be represented using their corresponding RSs carried, i.e., {S, I, M}. In the following, {CMR, IMR, muting} and {S, I, M} are used interchangeably to describe types/categories/classes/groups of RS resources. In the following, a UE determines/selects a RS resource as a type/category/class/group of resource may also be referred to as the UE categorizes/groups/classifies the RS resource into the type/category/class/group of resource. Such the RS resource may be referred to as a categorized/classified/grouped/selected RS resource. The terms of "type", "category", "group" and "class" are used interchangeably in the following to describe determination of a RS resource as one type of resource, unless otherwise specified. The following embodiments are described using the three categories {CMR, IMR, muting} or {S, I, M}, as an example. Those of ordinary skill in the art would recognize that a less number of categories or a more number of categories than three (3) is possible.

The UE 1102 may determine a type for each of the set of RS resources or each of a subset of the set of RS resources. In an example, the UE 1102 may determine some of the set of RS resources as CMRs, some other RS resources as IMRs, some others as muting or ZP resources. In another example, the UE 1102 may determine that none of the RS resources as CMR, or as IMR, or as muting resource. In this way, after determining the type for each of the set of RS resources, i.e., after categorizing the set of RS resources into the categories {CMR, IMR, muting} or {S, I, M}, the UE 1102 may obtain a combination of categorized RS resources into the categories {CMR, IMR, muting}, with each category including 0, 1 or more RS resources categorized into the corresponding category. In the following, such a combination of categorized RS resources will be referred to as a "combination" or an "S-I-M combination" for illustration simplicity. Forming or obtaining one combination may include finding zero, one or more RS resources from configured RS resources for each of the categories. For example, in a case that the set of RS resources includes six RS resources (R1-R6), a combination may be formed and represented as {CMR (R1, R2, R3), IMR (R5), muting (R4, R6)} (or {S (R1, R2, R3), I (R5), M (R4, R6)}). The combination indicates that RS resources R1, R2, R3 are determined as CMR, RS resource R5 is determined as IMR, and RS resources R4 and R6 are determined as muting resources. The UE 1102 may form various different combinations of these six resources categorized into the three categories. Taking the six RS resources as an example, the UE 1102 may obtain a first combination {CMR (R1, R2, R3), IMR (R5), muting (R4, R6)}, a second combination {CMR (R1, R2, R3, R6), IMR (R5), muting (R4)}, and a third combination {CMR (R1, R2), IMR (R3, R5), muting (R4, R6)}. The same resource may not be determined to have more than one type of {S, I, M}. In some embodiments, in forming combinations, the category of CMR or S is required to be present, i.e., the UE 1102 needs to select at least one RS as CMR. The category of CMR needs to include at least one resource categorized, which corresponds to the case where the UE needs to have a serving signal for a transmission but no serving signal (CMR) has not been configured. In some embodiments, the category of IMR/I or muting/M may not be present. That is, the UE 1102 may not need to select any RS resource as IMR or muting as configured by the network. The category of IMR or muting may be null.

In some embodiments, multiple combinations may be found and formed by the same UE 1102 over the same set of RS resources, but the UE may not report all the combinations formed. The UE 1102 may select to report one or more of the multiple combinations. Whether to report one or more of the multiple combinations may be determined based on a reporting rule configured for the UE 1102. For example, the UE 1102 may select a combination that satisfies a criterion configured in the reporting rule. An example of the criterion may be an efficiency range (e.g., >5; [3.5, 5), etc.), a SINR range (15~20 dB), a CQI index range (e.g., CQI index 10~12 per FIG. 14), etc. Details about the reporting rule will be provided later in the description. The RS resources and the reporting rule may be associated with a CSI report configuration (also known as CSI reporting configuration, CSI reporting setting, or CSI report setting)

The UE 1102 may generate a CSI report (step 1118) based on the CSI measurement and the obtained one or more combinations, and transmit the CSI report to the base station 1104 (step 1120). The UE 1102 may generate one or more CSI report quantities, such as a channel quality indicator (CQI), a rank indicator (RI), a channel resource indicator (CRI), etc., and report these quantities in the CSI report. In addition to these quantities, the CSI report may also include one or more combinations, such as one or more of the three combinations {CMR (R1, R2, R3), IMR (R5), muting (R4, R6)}, {CMR (R1, R2, R3, R6), IMR (R5), muting (R4)}, and {CMR (R1, R2), IMR (R3, R5), muting (R4, R6)}, as discussed above. Each combination may correspond to different values of the CSI report quantities. The UE 1102 may report one or more CSI reports, and each CSI report may include (or associate with) a combination of categorized RS resources. Each CSI report may be reported according a CQI table as specified in the standard. Alternatively, a different CQI table may be used. As discussed in this application, the RS resources left for UE to determine their categories may be beamformed/precoded, and therefore no PMI is associated with these RS resources. In other words, PMI may not be part of the CSI report for RS resources whose categories are determined by UE. When more than one NZP port are determined as CMR, i.e., serving signals, it may become a multi-rank transmission, and one CQI value may be reported for rank 1~4 transmission (in NR, rank 1~4 corresponds to one codeword and hence one CQI/MCS is associated with rank 1~4 transmission). Even higher ranks may be supported with 2 codewords and hence 2 CQI/MCS values, but this is not very likely in practice. Note that the CMR ports/resources may be QCLed to the same TRS/SSB, i.e., from the same TRP, or QCLed to different TRS/SSB, i.e., from multiple TRPs. If the multiple TRPs are tightly synchronized, connected with fast backhaul, and located not too far from each other, one codeword/CQI/MCS for 1-4 layers may be possible. However, at least in cases where the above conditions are not well met, the CMR ports/resources may be associated with two CQI values (generally different) during UE reporting, and two MCS levels (generally different but may be the same) are possible from multi-TRP transmission (the codeword may be same or different). That is, for example, if the UE has determined and/or is configured with port 1 and port 2 in CMR, wherein port 1 is QCLed to TRS 1 and port 2 is QCLed to TRS2, then two CQI values may be reported separately for port 1 and port 2. For each subset of CMR ports/resources determined by the UE and/or configured for the UE that are QCLed to the same TRS/SSB, one CQI value is reported for up to rank 4 transmission. In general, the network may specify whether one or two CQIs are required to be reported for non-QCLed CMR ports/resources as part of the reporting rule. For example, if the reporting rule defines only one CQI/SINR range (e.g., 15-20 dB), then one CQI value is reported; if the reporting rule defines more than one range (e.g., 15-20 dB for one of them and 10-15 dB for the other) or a range for sum SINR (e.g., sum SINR to be within 23~28 dB), then two CQI values are reported. The reporting rule (or a standard) may also restrict the UE to select CMR ports/resources that are QCLed to the same TRS/SSB, that is, the serving signal(s) may be from only one TRP (such as to support dynamic point selection (DPS)), in which case the UE do not select ports/resources QCLed to different TRSs/SSBs and reports only one CQI value for up to 4 layers.

The UE 1102 may be configured with a report configuration, which specifies, to the UE 1102, what to report (e.g., (reporting quantities), e.g., one or more combinations, CQI, RI, etc., based on what to report, e.g., configured resources/resource sets/resource settings, reporting time, e.g., periodically or aperiodically. Reporting of CQI and RI and other quantities may have different periodicities.

In some embodiments, a first RS resource reported according to a reporting setting of the UE 1102 may be associated with a first plurality of types, e.g., {CMR, muting}. That is, two categories {CMR, muting} are considered when determining the type of the first RS resource. The first RS resource categorized as CMR may correspond to one or more beams pointing to the UE 1102, and hence a serving/muting decision made for the first RS resource and other RS resources with respect to the first plurality of types indicates a serving beam/layer selection decision. Optionally, a second RS resource reported according to the same reporting setting may be associated with a second plurality of types, which may be the same as or different from the first plurality of types, e.g., {IMR, muting}. The second RS resource categorized as IM may correspond to one or more beams not pointing to the UE 1102, and hence an interfering/muting decision made for the second RS resource and other RS resources with respect to the second plurality of types indicates an interfering beam/layer selection decision or layer muting decision. Optionally, a third RS resource associated with a third plurality of types, e.g., {CMR, IMR, muting} may also be possible, so on and so forth.

The base station 1104 may perform coordination and LA based on the CSI report. For example, the base station 1104 may select, from the CSI report and upon traffic arriving, a combination reported, together with the CSI report quantities corresponding to the combination, and perform LA for the traffic. In one example, when a URLLC traffic burst with many bits and very strict latency requirement (e.g., 3 ms) arrives, the base station 1104 may determine that >5 efficiency is needed for this burst, which corresponds to a combination {CMR (R1, R2, R3, R6), IMR (R5), muting (R4)} reported by the UE for >5 efficiency, for example. The base station 1104 may select a CQI value corresponding to >5 efficiency, determines a corresponding modulation coding scheme (MCS), and the corresponding S-I-M combination. Then the base station 1104 may transmit the data burst (e.g., PDSCH) with the determined MCS on ports associated with R1, R2, R3 and R6 with the same beamformers as in the NZP CSI-RS resources (which is reflected in the PDSCH's DMRS), coordinate with some other base stations (if needed) that interfering transmission associated with the port/beamformer R5 is allowed, and coordinate with some other base stations (if needed) that transmissions associated with port/beamformer R4 needs to be muted. Since the network transmits/interferes/mutes PDSCH transmissions according to the UE's measurement/report for >5 efficiency, the UE will experience >5 efficiency in the PDSCH which matches the MCS as the network expects. This can guarantee (with sufficiently high probability) successful transmission of the URLLC traffic burst as required. In another example, when a URLLC traffic burst with not many bits and not very strict latency requirement (e.g., 15 ms) arrives, the base station 1104 may determine that an efficiency range 1.5 to 2 is sufficient for this burst, which corresponds to a combination, {CMR (R1), IMR (R2, R3, R5, R6), muting (R4)} reported by the UE, for example. The base station 1104 may select a CQI value corresponding to 1.5 to 2 efficiency, determines a corresponding MCS, and the corresponding S-I-M combination. Then the network will perform the transmission/interfering/muting in accordance with the combination, which can guarantee (with sufficiently high probability) successful transmission of the burst and leave more time-frequency resources for other UEs/base stations than the first example. In general, the more stringent the URLLC requirements are, the more time-frequency resources the burst will consume, leaving less resources for other transmissions. The embodiment coordinated scheme may provide the network with capability of successfully delivering the burst while minimizing impact on other UEs/base stations in resource usage. If the most favorable combination (e.g., all ports/resources are serving the UE) still cannot meet a URLLC requirement, it may be an indicator that the URLLC requirement exceeds the network capacity.

Figure 12:
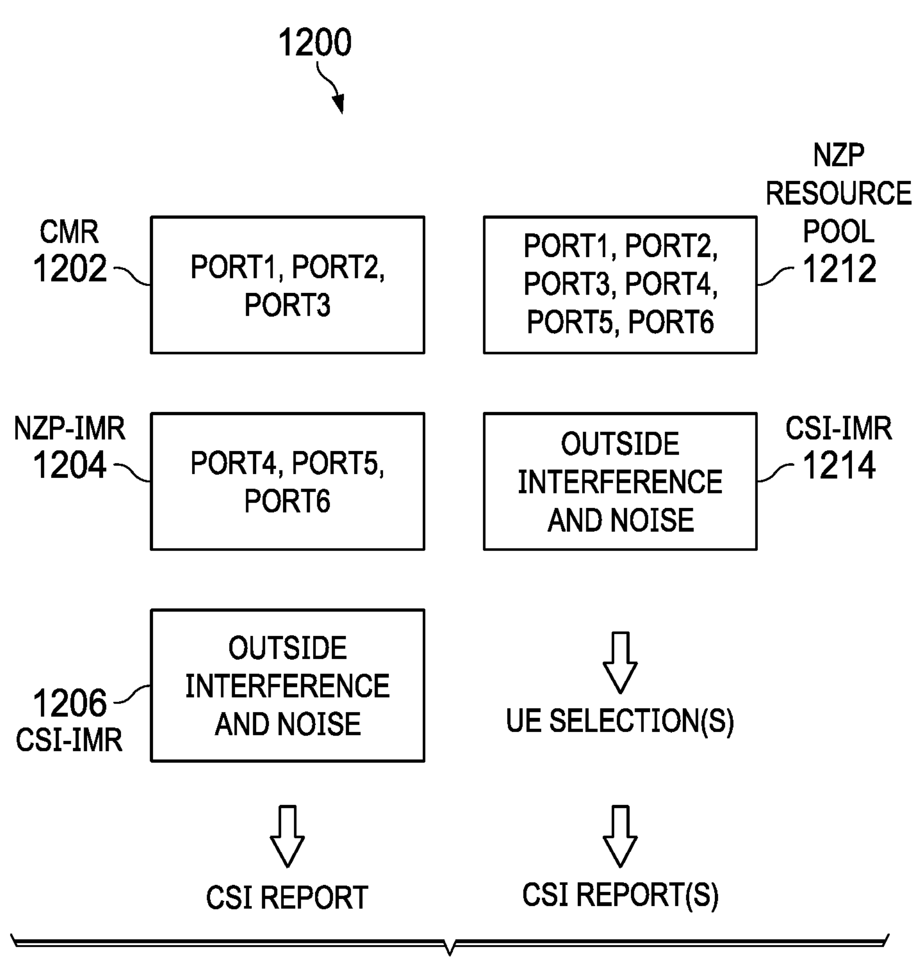
FIG. 12 illustrates a diagram showing a conventional CSI measurement and report method and an embodiment CSI measurement and report method.

FIG. 12 illustrates a diagram 1200 showing a conventional CSI measurement and report method and an embodiment CSI measurement and report method as discussed above. In this example, RS resources for CSI measurement and report include six (6) ports: port1-port6. Conventionally, a network specifies, to a UE, which of the RS resources is for CM and which is for IM. For example, as shown, the network may specify that port1-port3 are (NZP) CMRs (block 1202), and port4-port6 are (NZP) IMRs (block 1204). The UE may also be configured with IMR(s) (typically CSI-IM resource(s)) to measure outside interferences and noise (block 1206). Based on such specification, the UE may perform CSI measurement and CSI reporting. The UE does not have the flexibility to select its serving/interfering/muting signal, and one CQI (as well as the associated RI, etc., if any) is generated/reported at one time.

Based on the embodiments of the present disclosure, the UE is configured with the RS resources for CSI measurement and report, however, the network does not specify the types of the configured RS resources. That is, the network does not specify which of the RS resources is for CM and which is for IM. As shown, the UE is configured with port1-port6 in a NZP resource pool (which may be configured as a resource set or resource setting) for CSI measurement and report (block 1212). The UE may also be configured with a CSI-IM resource for measuring outside interferences and noise (block 1214). The UE does not know whether each of the ports 1-6 configured is for CM or for IM. The UE then selects one or more ports from port1-port6 as CMR, and selects one or more other ports from port1-port6 as IMR. Based on the UE's selection and the measured outside interferences and noise, the UE may perform CSI measurement, CSI derivation, and CSI reporting. The embodiment CSI measurement and reporting may be performed before the UE starts URLLC communicating with the base station, or when the UE is not performing URLLC communication with the base station, typically in a periodic or semi-persistent way, via periodic/semi-persistent CSI-RS resources and/or periodic/semi-persistent reporting. The CSI measurement and reporting is thus performed "offline". In this way, the CSI measurement and reporting does not affect the UE's URLLC communication, while providing useful information for the network to allocate resources for communication.

It is beneficial that UEs themselves are able to determine/select, instead of being configured by network, resources used as their CMR, IMR or muting for downlink transmissions. The impact of a serving signal, interfering signal, or muting signal on the resulting SINR/CQI/efficiency generally may be more accurately estimated by the UE via its receiver, instead of by the network, and the SINR/CQI/efficiency accuracy is especially vital to URLLC that requires low latency and high reliability. However, if without restrictions, a UE may select and report all available resources for its serving signals, which is natural because that leads to the highest possible SINR/CQI/efficiency for the UE. For example, the UE may select all the six resources R1-R6 in the previous example as its CMRs. If every UE selects and reports all RS resources as CMRs, UEs' selection/determination of RS resources may become less meaningful as the network can rarely allocate all resources for just one UE. Thus, rules are desirable to restrict UEs in selecting and reporting their combinations, although a UE may find many different combinations.

In some embodiments, rules (or referred to as reporting rules which restrict reporting of UEs' selection of the S-I-M combinations) may be defined to specify requirements (or criteria), based on which a UE determines whether a RS resource is one of the plurality of types of resources (e.g., selects a combination), and reports the determination (selected combination). A combination satisfying a requirement will be selected/determined and reported by a UE. In some embodiments, the requirements may include an efficiency requirement, a CQI requirement, a signal to noise ratio (SNR) requirement, a signal to interference and noise ratio (SINR) requirement, a rank requirement, or a combination thereof. Other requirements that may be used for a UE to determine a type of a configured RS resource are also applicable. Generally one reporting rule may require the UE to report at least one CQI (as well as related reporting quantities), and if more than one reporting rule is configured for the UE for one reporting setting, the UE may be required to report at least one CQI (as well as related reporting quantities) for each of the reporting rules.

In some embodiments, each of the requirements may specify one or more thresholds, or a threshold range. For example, the CQI requirement may specify a CQI threshold, e.g., 20 dB, or a CQI threshold range, e.g., 25-30 dB (note that though CQI in standards is expressed via CQI indexes, often times CQI is also loosely expressed as a form of SINR in terms of dB). The SNR/SINR requirement may specify a SNR/SINR threshold or a SNR/SINR threshold range. The rank requirement may specify a rank threshold, e.g., 2, or a rank threshold range, e.g., 1-3. An efficiency requirement may specify one or more efficiency thresholds, or an efficiency threshold range.

A UE may determine a value, e.g., a CQI value, a SNR/SINR value, a rank value, or an efficiency value, corresponding to a requirement, and determine whether the corresponding requirement is satisfied by determining whether the value satisfies (e.g., greater than, or less than, and/or equal to) a threshold specified in the requirement, or falls within a threshold range of the corresponding requirement. The value, e.g., the CQI value, SNR/SINR value, or rank value, may be determined based on a combination of categorized RS resources. If the corresponding requirement is satisfied, then the combination of categorized RS resources is determined/selected and reported by the UE. If the corresponding requirement is not satisfied, the combination is not selected and reported.

In an example where a UE is configured with three (3) RS resources, e.g., port1-port3, for CSI measurement and report and configured with a CQI requirement, the UE may try and find various possible combinations that categorize the three ports for CM, IM and muting. Table 1 shows seven (7) possible combinations, with at least one CMR present. Other combinations may also be possible. In theory, there may be more than 20 possible combinations that categorize the three ports into the three categories. The UE may determine a CQI value based on each combination. The first column of Table 1 shows some combinations, the next three columns show the three categories (types of resources): {CMR, IMR, and muting}, and entries in these three columns show which RS resources are categorized into the three categories. Column 5$^{th}$ indicates a CQI value determined based on each combination found. The "null" in an entry corresponding to one category indicates that this category includes no RS resource determined by the UE, i.e., no resource is categorized into this category in a corresponding combination. For example, combination No. 1 includes R1-R3 categorized as CMR, and no resource is categorized as IMR or muting. In another example, combination No. 4 includes R2 and R3 categorized as CMR, R1 categorized as IMR, and no resource is categorized as muting.

TABLE 1

| Combination No. | CMR | IMR | Muting | CQI (SINR) value (dB) |
|---|---|---|---|---|
| 1 | R1, R2, R3 | null | null | 50 |
| 2 | R1, R2 | R3 | null | 28 |
| 3 | R1, R3 | R2 | null | 23 |
| 4 | R2, R3 | R1 | null | 12 |
| 5 | R1 | R2 | R3 | 21 |
| 6 | R2 | R1 | R3 | 17 |
| 7 | R3 | R1 | R2 | 10 |

In one example, if the CQI requirement specifies a threshold range 15-20 dB. inclusive (i.e., including 15 and 20 dB), based on which, the UE may select the combination number 6, which has a corresponding CQI value of 17 dB falling into the threshold range, and report this combination. Thus, under the restriction of the CQI requirement, the UE may only report one combination although multiple combinations are possible.

In some embodiment, the network may configure one or more rules/requirements for one or more UEs, and the UEs determine and report their respective combinations of categorized RS resources accordingly. For example, the network configures a first CQI requirement specifying a first threshold range 15-20 dB and a second CQI requirement specifying a second threshold range 25-30 dB. In this case, the UE may select and report the combination No. 6 (with a CQI value of 17 dB within the first threshold range) and the combination No. 2 (with a CQI value 28 dB within the second threshold range). The two CQI requirements may be configured for the UE in the same reporting rule or different report rules. In another example, the network configures a reporting rule that requires reporting combinations with >5 efficiency and a maximum rank 3. In this case, the UE may find combinations with at most 3 RS resources/ports as CMR, and select, from the combinations, one or more combinations that satisfy the efficiency requirement. The combination No. 1 can be an example meeting the reporting rule. In another example, the network configures a reporting rule that requires reporting combinations with 20-25 dB and a maximum rank 2. In this case, the UE may find combinations with at most 2 RS resources/ports as CMR, and select, from the combinations, one or more combinations that satisfy the efficiency requirement, e.g., the combination No. 3.

The network may also instruct the UE to report one or more combinations corresponding to one reporting rule (or one requirement). This may be configured together with the reporting rule. In some embodiments, a reporting rule may specify a criterion that a reported combination needs to satisfy, and also a maximum number of combinations (satisfying the criteria) that can be reported. For example, the network configures a reporting rule specifying a threshold range 15-25 dB, and requiring to report only one combination based on the reporting rule. Table 1 shows that the combinations No. 3, 5 and 6 all satisfy the reporting rule. However, the UE may only select and report one combination. In one example, the UE may select and report the combination No. 3, which has the highest CQI value. The UE may also randomly select one to report. In an example, if the network specifies that the UE can report two combinations based on the reporting rule, the UE may select and report two combination for reporting, e.g., the combinations No. 3 and 5.

A UE may select to mute on one or more NZP resources or ports, on which the network will not transmit data. A UE may find none, one or multiple combinations based on a reporting rule. A UE may report none, one or more combinations according to a reporting rule and a network configuration. The network configuration may indicate whether the UE is allowed to report one or more combinations satisfying a requirement. The UE's determination/selection of the combinations may be seen as a "coordinated beam selection" as it is a way to enable multiple TRPs to coordinately decide on a set of beamformers for the TRPs, including muting, to manage interference.

Figure 13:
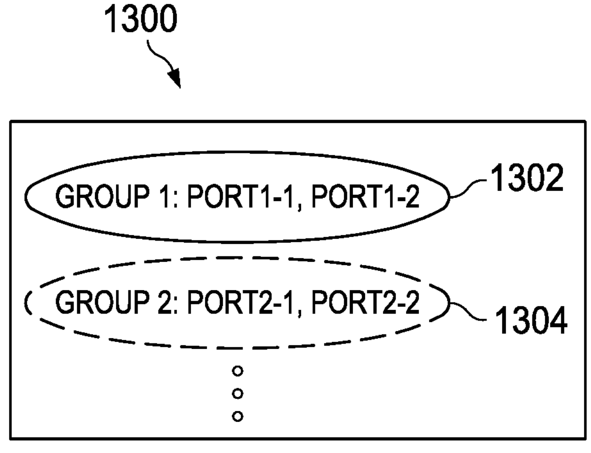
FIG. 13 illustrates a diagram showing different virtualized ports.

A UE may need to find multiple, or even all possible combinations of categorizing the RS resources, and determine/select and report one or more combinations according reporting rules. This causes large overhead to the UE when the quantity of the RS resources is large. The reporting rules already help reduce the number of combinations that a UE need to find. Other mechanisms may also be applied to reduce complexity on the UE side. In some embodiments, information of virtualized (beamformed) ports may be used to reduce the complexity. Different precoding vectors may be used for the same array of antenna elements to form different virtualized ports. Virtualized (beamformed) ports of the same array of antenna elements may be grouped into one group, and each port is already beamformed and cannot be changed by the UE. FIG. 13 illustrates a diagram 1300 showing different virtualized ports. Port group 1302 includes virtualized ports of the same first antenna array of antenna elements. Port group 1304 includes virtualized ports of the same second antenna array of antenna elements. A UE may select at most one port from each group. That is, the UE cannot select 2 or more in a port group as they share the same array. For example, if the UE selects port1-1 for CMR, then the UE cannot select port1-2 for CMR, IMR, or muting. This reduces the number of combinations that the UE need to find. Note that the UE side does not need to know how the network performs the beamforming and may just need to be informed with minimum information about which ports belong to the same group and at most only one out of each group may be selected for all possible categories. This "grouping" concept does not even need to be associated with virtualized ports only. It may be used to let the UE pick one (CMR or IMR) from a group of measurement resources configured for the UE. In an embodiment, a group of NZP resources are configured for a UE, each corresponding to one transmission hypothesis (e.g., one beamforming out of a group of beamforming, one TRP out of a group of TRPs, etc.), and the UE selects only one as CMR for CSI reporting and all others may be viewed as muting (non-serving non-interfering). Likewise, one out of a group of measurement resources may be selected as IMR for CSI reporting and all others may be viewed as muting (non-serving non-interfering). Furthermore, one out of a group of CSI-IM resources may be selected as IMR for CSI reporting. In the above embodiments, the selection of CMR may affect the selection of IMR and vice versa, i.e., the resources are related, which requires additional signaling from the network.

The S-I-M combinations selected by different UEs in a coordinated area with one or more TRPs based on the same configured RS resources may not be consistent. For example, a first UE may determine and report a combination of {CMR (R1, R2, R3), IMR (R5), muting (R4, R6)}, and a second UE may determine and report a combination of {CMR (R4, R5, R6), IMR (R1), muting (R2, R3)}. In an example, when traffic, e.g., URLLC traffic, arrives for the first UE and no traffic is for the second UE, the network may follow the first UE's selection of the combination to perform LA for the first UE. When URLLC traffic arrives for the first and the second UEs, respectively, and if their selections are consistent, then the network may follow the two UEs' selections to perform respective LA for the first and second UEs. However, when URLLC traffic arrives for the first and the second UEs, respectively, and if their selections are inconsistent, then LA for one of the UEs may not be guaranteed by the network.

One embodiment to reduce such an inconsistency may be to further reduce the number of combinations that the UE can select, e.g., by applying further restrictions, and the network can utilize the restrictions to limit the available degrees of freedom so that the resultant combinations are more likely to be consistent. In another embodiment, some RS resources, e.g., ports, may be left as un-decided by a UE when the ports satisfy a margin requirement, and a UE may not categorize a port into any category when the port satisfies the margin requirement. Leaving the port undecided provides flexibility (or an option) for the network to determine resources for downlink transmission when inconsistent selections are reported. A UE may report the un-decided port explicitly, and does not report its category. An un-decided port may be implicitly indicated to the network through reported combinations that do not include the un-decided port. The network may thus utilize the port to perform LA for multiple UEs reporting inconsistent combinations. For example, a port showing low power may by default be selected as IMR and its impact on the resulting CQI may be small enough to affect the CQI value. Such a port may not need to be categorized and/or reported along with a CQI. The margin requirement may be configured by the network. The margin requirement may specify margin values, e.g., +/−1 dB with respect to the CQI report. For example, if one or more ports or one or more resources are categorized as a CMR, and the resulting CQI SINR is 23.8 dB, if they are categorized as a muting resource and the resulting CQI SINR is 23.1 dB, and/or if they are categorized as an IMR and then the resulting CQI SINR is 22.3 dB, i.e., the CQI SINR resulted from categorization of these ports/resources varies within +/−1 dB. The UE thus determines that these ports/resources affect the resulting CQI by at most+/−1 dB, so the UE does not report the category for these resources. The UE may also determine a margin value, and based on which the UE determine the RS resources that are not to be categorized. The UE may then report the margin value, such as +/−2 dB, or [0, 2.5] dB, etc. After receiving the report, the network can freely decide/modify the transmission/beamforming on these resources and understand this will have only very limited impact on the SINR of the UE. In any case, the network may use the margin to slightly adjust the LA or resource allocation to reflect the marginal impact of these resources.

Two aspects may be taken into consideration for UE to determine types of the RS resources: 1) how to combine the categorized RS resources into one compatible pattern usable at the gNB? 2) How to reduce the combinatorial complexity? In some embodiments, types of one or more RS resources (which are a subset of the CSI measurement resources usable by the UE for a CSI report) may have been pre-determined or pre-configured for one or more UEs, so that the UEs do not have options to categorize those RS resources. For example, for a certain UE, there may be some NZP IMR pre-determined, and/or some CMR pre-determined, among RS resources configured for this UE. The UE can select its CMR, IMR and muting resources from the rest of the RS resources excluding the pre-determined resources. In other words, the network may specify one or more CMRs, IMRs and/or muting resources among configured RS resources. Table 2 shows some pre-determined CMRs for different UEs among a set of RS resources, i.e., port1-port8. As shown, port1 and port 2 are pre-configured as CMR for UE1, port3 is configured as CMR for UE2, port7 and port 8 are pre-configured as CMR for UE3, port5 and port 6 are pre-configured as CMR for UE4. With the CMR pre-configured, the UEs only need to find possible combinations from the remaining ports that are not pre-configured. For example, UE1 may form combinations from port3-port8, and select and report one or more combinations that satisfy one or more reporting rules.

TABLE 2

| | Port 1 | Port 2 | Port 3 | Port4 | Port 5 | Port6 | Port 7 | Port 8 |
|---|---|---|---|---|---|---|---|---|
| UE1 | s | s | | | | | | |
| UE2 | | | s | | | | | |
| UE3 | | | | | | | s | s |
| UE4 | | | | | s | s | | |

By pre-configuring one or more RS resources as CMR, IM and/or muting resources, complexity of UEs determining S-I-M combinations is reduced, and the processing burden of the UEs are thus reduced.

The CQI value, the SNR, or the SINR value may be derived by a UE based on CM on a set of CMRs and an IM on a set of IMRs. The set of CMRs may include one or more RS resources configured (or pre-configured) by a network for CM, and one or more RS resources determined by the UE for CM, as discussed above. The set of IMRs may also include one or more RS resources configured (or pre-configured) by the network for IM, and one or more RS resources determined by the UE for IM as discussed above. The IMRs configured (or pre-configured) by the network for IM may include NZP CSI-RS resource(s) for IM and/or CSI-IM resource(s). For example, if the UE determines or is configured with ports 1 and 2 as CMR, ports 3 and 4 as IMR, 5 and 6 as muting, and then the SINR associated with port 1 would be computed as follows. For port 1, the UE determines a receive filter w, which is applied to all the receive antenna elements for ports 1~4 as well as the associated CSI-IM resource for outside interference plus noise. The receive powers at the ports 1-4 are then measured and computed as p1~p4 4 and I0. The SINR, when port 1 is determined as CMR, is calculated as p1/(p2+p3+p4+I0) (noticing that p2 is in the denominator even though it may also be CMR as it is the inter-layer interference unless the ports are orthogonal). This can be done likewise for port 2 when port 2 is determined as CMR. When both are CMR, the port 1 SINR and port 2 SINR may then be combined into one rank-2 CQI/SINR/efficiency including 2 layers but only one CQI/SINR/efficiency value (as for one codeword) or left as two CQI/SINR/efficiency values (as for two codewords, in general). In general, ports from the same TRP (i.e., QCLed to the same TRS/SSB) may be orthogonal (via, e.g., time division multiplexing (TDM)/frequency division multiplexing (FDM)/space division multiplexing (SDM)), i.e., there may be no inter-layer interference when the UE derives SINR/CQI/efficiency. However, ports from different TRPs (QCLed to different TRSs/SSBs) may or may not be orthogonal, and may or may not interfere with each other. When they both are CMR, there may be inter-layer interference (such as in the multi-TRP SDM case) or there may not be interference (such as in some multi-TRP FDM/TDM/SFN), in which case the network needs to provide information to the UE about whether to assume interference among the CMR ports/resources or not, so that the UE can correctly derive the SINR/CQI/efficiency.

In some embodiments, to reduce the complexity, restrictions may be applied to limit choices of UEs on NZP resources for serving signals and for interference signals. For example, one or more of the following limitations may be applied to UEs when determining the categories:

- A total number of serving layers/ports and/or rank is at most Ns;
- A total number of interfering layers/ports is at most Ni;
- A total number of serving/interfering layers/ports is at most N; adding a serving layer/port reduces an interfering layer/port and vice versa;
- A total number of muting layers/ports is at most m;
- Fixed $n_s$ layers/ports for serving, and UEs are not allowed to determine the categories for these $n_s$ layers/ports;
- Fixed $n_i$ layers/ports for interfering, and UEs are not allowed to determine the categories for these nilayers/ports;
- If a first port/resource is selected as a first category, a second port/resource has to be selected as a second category (the second category may or may not be the same as the first);
- If a first port/resource is selected as a first category, a second port/resource cannot be selected as a second category In some embodiments, the complexity may be reduced by using more muting. For example, a UE may be configured to categorize RS resources into two categories {CMR, muting}, instead of three categories {CMR, IMR, muting}. In some embodiments, the number of RS resources configured for a UE, from which the UE selects and reports combinations, may be limited within a threshold or a threshold range, e.g., 4-8 resources/ports. Other mechanisms may also be applied in order to reduce the complexity of UEs to select and report types of RS resources, without departing the principle and spirit of the present disclosure.

A UE may report one or more CSI/CQI reports for one report configuration of common resource setting or resource settings. Each CSI/CQI report may be reported according to a current CQI table (e.g., according to a 3GPP technical specification (TS)), with each associated with or including an S-I-M combination of the UE's selection. FIG. 14 illustrates a CQI table 1400 as specified in a 3GPP TS 38.214.

In some embodiments, the UE may be configured to report S-I-M combinations in a pre-determined order, and the UE may exhaustively report all CSI/CQIs of possible S-I-M combinations satisfying a reporting rule. Configuration of the pre-determined order may be performed via a separate signaling (e.g., via downlink control information (DCI)). The ordering may be based on the CQI levels. An alternative way to order all the combinations is to follow the natural order of the to-be-determined ports and order of the CMR/IMR/muting. For example, if port 3 and port 4 are to be determined, then a natural order is combination 1 {CMR (3,4), IMRQ, muting ( )}, combination 2 {CMR(3), IMR(4), muting ( )}, combination 3 {CMR(3), IMR( ), muting (4)}, combination 4 {CMR(4), IMR(3), muting ( )}, combination 5 {CMR( ), IMR(3,4), muting ( )}, combination 6 {CMR( ), IMR(3), muting (4)}, combination 7 {CMR(4), IMR( ), muting (3)}, combination 8 {CMR( ), IMR(4), muting (3)}, combination 9 {CMR( ), IMR( ), muting (3,4)}. ( ) indicates that there is no RS resource categorized in that category, or the category is null. There are totally ceiling(log(n1×n2)) bits for indicating a combination, wherein n1 is the number of ports/resources/resource sets to be determined by the UE for their categories, and n2 is the number of categories. Different ways to order the combinations and associated bit sequences may be considered, e.g., order across the categories first and then the ports (as done in the above example), or order across the ports first and then the categories. A bitmap for the to-be-decided port/resource/resource set may also be used, wherein one or more bits are used to indicate the category of each port/resource/resource set. Then only CQI levels need to be reported in terms of the ordering without reporting the combinations if all combinations are to be reported. The ordering may also be readily turned into a bit sequences or bitmap for reporting overhead reduction in other reports in this application, such as with only some combinations selected and therefore the combinations need to be indicated. Table 3 shows an example of CSI reporting of a UE configured with a set of RS resources, i.e., port 1-port5. Among the five ports, port 1 is pre-configured for CM (i.e., as a serving port), and port 4 is pre-configured for IM (i.e., as an interfering port). Other CSI-IM resource may also be pre-configured. In this example, the UE is configured to report combinations in an order of CQI levels within a CQI range. The UE selects and reports four combinations according to the configuration: combination 1{CMR(port2), IMR( ), muting (port5)}, and combination 2 {CMR(port2), IMR(port5), muting ( )}, combination 3{CMR( ), IMR( ), muting (port5)}, and combination 1{CMR( ), IMR(port5), muting ( )}, which can be turned into bits representations as described above. The report of the each of the combination 1 and combination 2 is a rank 2 report (which could have only 1 CQI level reported), and the report of the each of the combination 3 and combination 4 is a rank 1 report. The report of the four combinations may also include their corresponding CQI levels or equivalent/related quantities, as shown in Table 3.

TABLE 3

| Combination No. | CQI level | Serving port (CMR) | Interfering port (IMR) | Muting port | Rank or serving layers |
|---|---|---|---|---|---|
| 1 | 15 | Port 2 | null | Port5 | 2 |
| 2 | 12 | Port 2 | Port5 | null | 2 |
| 3 | 10 | null | null | Port5 | 1 |
| 4 | 8 | null | Port5 | null | 1 |

In some embodiments, a UE may be allowed to select, by itself, one or more combinations for reporting from possible combinations that satisfy a configured criteria or requirement, when the UE is configured to report less than a threshold number of combinations. The requirement may include those requirement discussed previously, such an efficiency requirement, a CQI requirement, etc. Using the combinations of Table 3 as an example, the UE is configured to report one combination satisfying an efficiency requirement, e.g., with an efficiency within an efficiency threshold range of [3.5, 5), and the UE finds that both combination 1 and combination 2 satisfy this efficiency requirement. Because the UE is configured to report only one combination satisfying an efficiency requirement, the UE may select one of the two combinations for reporting. The UE may randomly select one from the two combinations, or select one that has a higher efficiency level. The UE may determine its own criteria or strategy to perform the selection. In another example, if the UE is configured for reporting a maximum 3 combinations corresponding to one efficiency requirement, the UE may repot both of the two combinations.

The UE may repot the CSI using an existing CQI table, e.g., the one illustrated in FIG. 14, or a different CQI table, e.g., a new CQI table different than the existing CQI table. This may reduce reporting overhead of the UE. For example, the network configures a UE to report types of RS resources that satisfy two CQI requirements, e.g., a first CQI threshold range [10 dB, 15 dB) and a second CQI threshold range [15 dB, 20 dB]. The network may configure the CQI requirements to ensure that the actual transmission may be performed at least according to the lower bound of the reported CSI. The UE may report two combinations satisfying the first CQI threshold range and the second CQI threshold range, respectively, using four (4) bits according to the existing CQI table 1400. In some embodiments, a new CQI table may be created that includes CQI levels that are aligned with the CQI requirements. For example, a new CQI table may include four CQI indexes (levels), with each corresponding to a CQI threshold range, e.g., [6 dB, 8 dB), [8 dB, 10 dB), [10 dB, 15 dB), and [15 dB, 20 dB]. In this case, to report the two combinations, the UE uses two (2) bits according to the new CQI table. A new CQI table may be created to include a subset of CQI levels of the existing CQI table (which leads to fewer bits to report a CQI level in the new table), or a smaller range of CQI levels than the existing CQI table (new levels may be added to existing levels to increase the accuracy). The new CQI table may be created when a UE is expected to report a combination including categories of S and M (or CMR and muting) in order to get sufficient total SINR/rate. In other words, the UE may be required to report a CQI/SINR/efficiency value within a range limited by the reporting rule, which may require fewer bits to report. If an efficiency range specified is 4.5234 and 5.5547, then the UE may only use 1 bit to report to the network its CQI index of either 13 or 14 (see FIG. 14). Furthermore, if the reporting rule specifies a range sufficiently narrow for the network to determine a MCS, such as a range defined by two consecutive efficiency values in FIG. 14, the UE may not even need to report the CQI index; reporting the combination associated with the CQI index is sufficient. This can also be generalized to cover the cases in which the UE is not required to report CQI/SINR/efficiency but just the combination (i.e., the resources/ports and their determined categories) meeting the reporting rule, which reduces reporting overhead.

Figure 15:
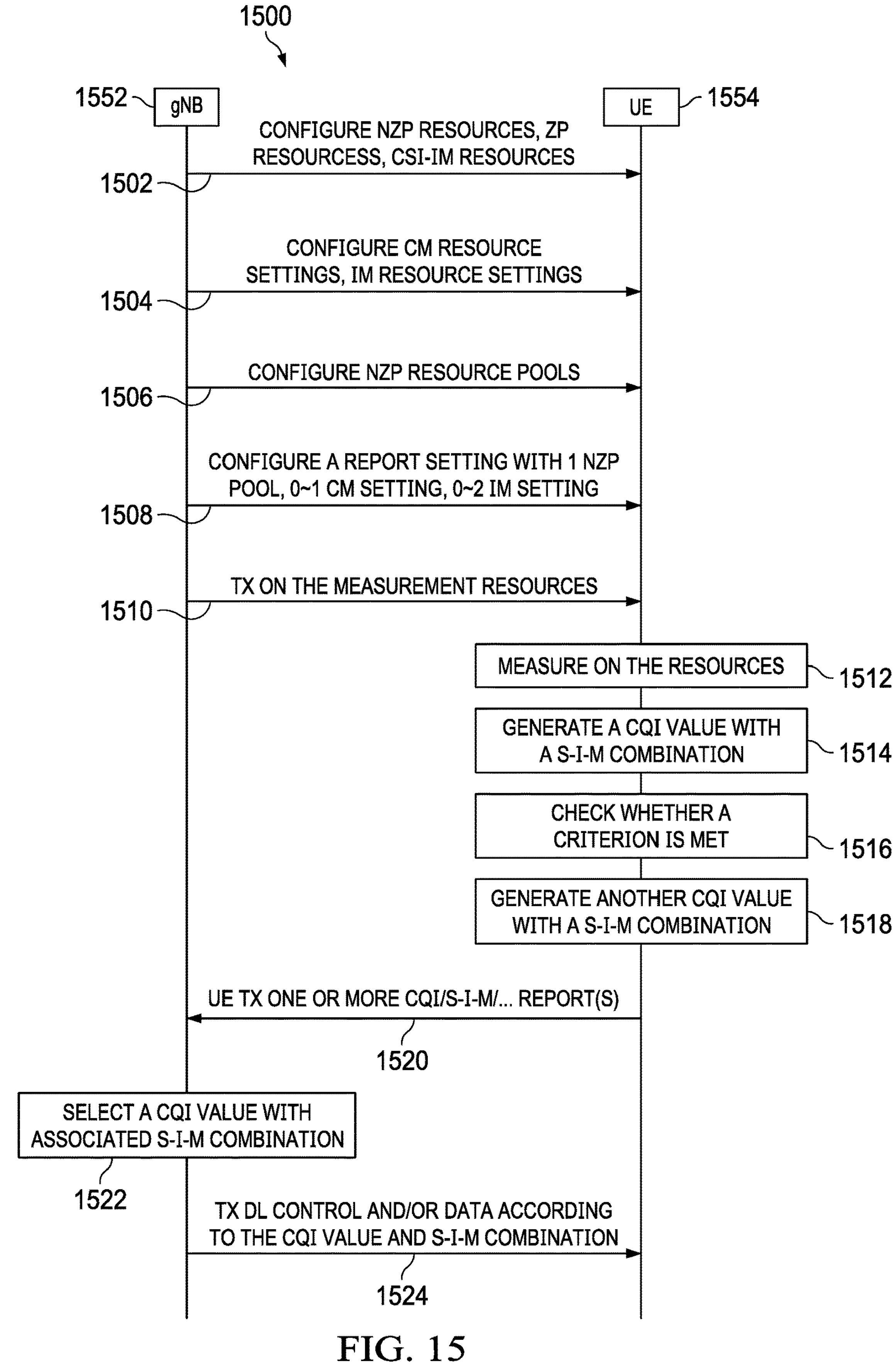
FIG. 15 illustrates a diagram of an embodiment CSI measurement and report method.

FIG. 15 illustrates a diagram of an embodiment CSI measurement and report method 1500. As shown, a gNB 1552 configures, for a UE 1554, NZP CSI-RS resources, ZP CSI-RS resources and CSI-IM resources for CSI measurement and report (step 1502). The NZP may be used for CM, IM, or to-be-determined resource (to be decided as CM, IM, or muting). The ZP may be generally used by the UE for rate matching, but may be extended as a candidate of muting. The CSI-IM is generally used for IM. The gNB 1552 may configure CM resource settings and/or IM resource settings for the UE (step 1504), e.g., in order to reduce complexity of the UE 1554 in determining types of the configured NZP resources. A resource setting generally specifies resource sets included in the resource setting that are to be used for CM or IM, but may be extended to be to-be-determined resource (to be decided as CM, IM, or muting, or if needed, in order to differentiate with decided resource settings, the to-be-determined may be called as a NZP resource pool or NZP pool) or muting. The gNB 1552 may specify which of the NZP resources (in step 1502) is for CM and/or IM, which may be done via the resource settings, which is useful to limit the number of combinations the UE may have. The gNB 1552 configures one or more NZP resource pools for the UE 1554 (step 1506). A NZP pool may be one or more NZP resource sets (or one or more NZP resources, one or more NZP ports) that are to be decided by the UE of its category (categories), and may be configured as a new CSI resource setting (in addition to existing 1, 2, or 3 CSI resource settings). The gNB 1552 configures a report setting with one NZP pool, 0-1 CM resource setting, and/or 0-2 IM resource setting (step 1508). Note that in prior arts, the CM resource setting must present as otherwise there is no serving signal to be measured and used in computing CQI/SINR/efficiency. In contrast, with the NZP pool present, the embodiments of the present disclosure may allow 0 (zero) CM resource setting as the serving signal may come from the NZP pool determined by the UE. Similarly, 0 (zero) IM resource setting may be allowed as the interference plus noise may come from the NZP pool, which is different from prior art, where 0 IM resource setting could only be used to measure RSRP or the like but not SINR. When 1 IM resource setting is present, it may be a NZP IM resource or a CSI-IM resource setting, and when 2 IM resource settings are present, they may include a NZP IM resource and a CSI-IM resource setting. So typical ways to specify a CSI report setting include configuring one NZP pool resource setting and one IM resource setting, and with optionally other CM/IM resource settings (totally up to 4 resource settings). The report setting may also comprise or be associated with a reporting criteria/rule. The gNB 1552 then transmits reference signals on the resources configured for the UE in step 1502 for CSI measurement (step 1510). The UE 1554 performs measurement on the configured resources (steps 1512). Based on the measurement, the UE generates a CQI value (or a SNR/SINR/efficiency/rank value) corresponding to an S-I-M combination that is formed (step 1514), and checks whether a criteria or reporting rule (e.g., a CQI/SNR/SINR/efficiency/rank requirement) is satisfied (step 1516). In this example, a CQI requirement is used. The CQI requirement may specify a CQI threshold range, as discussed above. If the generated CQI value is within the CQI threshold range, the S-I-M combination satisfies the CQI requirement. The UE continues to generate another CQI value corresponding to another S-I-M combination that is formed (step 1518), and checks whether this CQI value satisfies the CQI requirement. The UE 1504 may repeat steps 1514 and 1516, and may find zero, one or more combinations that satisfy the CQI requirement. The UE 1504 may then generate and transmit one or more reports including CQI values and the corresponding S-I-M combinations to the gNB 1502 (step 1520). When multiple combinations are found satisfying the CQI requirement, the UE may select to report one, more or all of the combinations according to a network configuration. The gNB 1502 my select one CQI value with its associated S-I-M combination (step 1522), e.g., when downlink transmission is needed for the UE 1504, and transmit downlink control signals and/or data according to the CQI value and the associated S-I-M combination (step 1524).

Categorizing the NZP CSI-RS ports in embodiments of the present disclosure is, to some extent, similar to DMRS ports split among UEs in massive MIMO/MU MIMO transmission mode (e.g., 12 ports are split among 6 UEs), and also similar to BiT UL/DL port resource sharing. A similar group-common indication may be adopted to indicate configured RS resources for CSI measurement. A group-common RS with many ports may be defined. For example, a NZP resource pool may be seen as one aggregated NZP resource (or set/setting) with many ports shared by UEs.

A gNB may be configured to have the freedom to change precoding for a port over time, to adapt to channel/interference variations and UE come-and-go. There is a benefit doing so. A UE lacking knowledge of this may experience issues if the UE performs averaging for CSI measurement and reporting. For example, during transmission time intervals (TTIs) 1~100, a gNB uses precoding 1 for port 1, but during TTIs 101~200, it changes to precoding 2 for port 1. If the UE averages its measurements over the 200 TTIs, the averaged value may not be meaningful at all. Existing technical specification of on/off (one-shot) non-averaging may be insufficient. One solution is that the UE may extend the averaging period to T TTIs. The averaging duration for a reporting configuration with a NZP pool may be signaled from the gNB to the UE so that the UE will not average across different precoding or different network configurations associated with the NZP pool. The UE may also use SP CSI with medium access control (MAC) activation/deactivation. This may create flexibility. For each newly activated SP CSI, CSI measurement may be reset at the beginning.

A base station, e.g., a gNB, may have the freedom to modify its transmission scheme to be different from what is made based on reported CSI. The gNB may determine transmission scheme by exactly following the reported CSI, or may modify the transmission scheme if it decides to. The gNB may need to ensure that the actual SINR after modification be higher for the indicated modulation and coding scheme (MCS). Corresponding behaviors of UEs configured for determining and reporting S-I-M combinations may be defined, configured, and/or standardized. Configuration of CSI-RS resource set or setting may also be modified, adjusted and/or defined to accommodate the UEs' determination and reporting of S-I-M combinations.

The network may need to coordinate CSI-RS resource allocation (or more generally, CSI measurement resource allocation) for UEs configured to report S-I-M combination. This may be done in a slow timescale. The network does not need to coordinate based on instantaneous CSI, and hence the overhead/complexity is lower than traditional CoMP of CBF (coordinated beamforming) and JT (joint transmission). The embodiment methods work especially well for URLLC factory setting with limited mobility.

Measurement based on P/SP CSI-RSs may age over time. Coordinated ultra-reliable low-latency communication (CURLLC) feedback may be used to eliminate dominant interference dynamics, but both serving channel and interfering channel may still have some dynamics. An aperiodic CSI reporting may be used if time allows. Channel dynamics may be very slow for URLLC factory setting. Tracking algorithms for serving channel and interfering channel may be used. A gNB may estimate and apply a margin for link adaptation.

If the channels are stationary, like in a factory, or home XR, the offline training for the coordinated CSI measurement scheme proposed in this application may be more accurate. For closed environment, the interference may be more readily coordinated rather than open space.

Various embodiments can support different transmission schemes, e.g., non-CoMP schemes, including SU-MIMO with rank n (n=1, . . . 8) transmissions, MU-MIMO with rank 1 or rank n transmission per UE, etc., and CoMP schemes, including coherent JT, non-coherent joint transmission (NCJT), single frequency network (SFN), dynamic point selection, dynamic point blanking (DPB), coordinated beam selection, coordinated beam blanking, in the forms of FDM, TDM, or SDM, etc., and the dynamic switching among all above schemes. An embodiment for non-CoMP schemes is that one or more NZP CSI-RS resources/ports are determined as CMR, and all CMRs are QCLed to the same TRS/SSB. All other NZP CSI-RS resources/ports (QCLed to the same or different TRS/SSB), if any, are determined as IMR/muting resources, except for those in the same group as the CMR ports/resources.

An embodiment for multi-TRP CoMP scheme is to allow the UE to select or be configured with CMR ports/resources QCLed to different TRS/SSB. Using the case that port/resource 1 is QCLed to TRS 1 and port/resource 2 is QCLed to TRS 2 as an example. If both are selected/configured as CMR, then JT is supported, but if one is CMR and the other is muting, then dynamic point blanking is supported. This could also be used as a reporting rule, that is, only one out of such two (or more, in general) ports/resources may be selected as CMR (i.e., choosing one or more from a CMR candidate pool formed by resources with configured categories as serving/muting), and the other (others) becomes muting, which may be used with or without other reporting rules (e.g., SINR range criteria, reporting only the highest/second highest CQI/SINR/efficiency criteria, etc.), and the UE just needs to report the index of the selected one for CMR. Likewise, the UE may choose one or more from an IMR candidate pool formed by resources with configured categories as interfering/muting. Alternatively, the UE may be required to report more than one CQI values with the same measurement resources, e.g., one for port/resource 1 as CMR and the other for port/resource 2 as CMR. The non-CMR port/resource may be either IMR or muting, which can lead to up to 4 CQI values to be reported to support dynamic point blanking (1 serving with 2 muting, and 2 serving with 1 muting, i.e., the configured categories are serving/muting) and dynamic point selection (1 serving with 2 interfering, and 2 serving with 1 interfering).

An embodiment supports coordinated beam blanking or dynamic point selection. Using the case that port/resource 1 is QCLed to TRS 1 and port/resource 2 is QCLed to TRS 2 as an example. If one is selected/configured as CMR and the other is selected/configured as IMR, this may be a way to support dynamic point selection; in addition, if the one selected as IMR is selected from a group of ports/resources with the restriction that at most one of the group can be selected, this may be a way to support coordinated beam blanking as the selected may correspond to reduced beamforming interference for that port/resource.

An embodiment support NCJT in the forms of FDM, TDM, and SDM from multiple TRPs. Using the case that port/resource 1 is QCLed to TRS 1 and port/resource 2 is QCLed to TRS 2 as an example. Both may be selected/configured as CMR. Two SINR/CQI/efficiency values may be derived with each as the serving signal. However, the other may not cause interference when the ports are orthogonal in FDM/TDM/SDM, or may cause inter-layer interference in NCJT SDM transmission mode and require the network to inform the UE. In cases of NCJT FDM/TDM with port 1 from TRP 1 and port 2 from TRP 2, on the resources that the TRP is not serving the UE, if TRP 2 may transmit to another UE with, e.g., port 3, then port 3 needs to be in the IMR of the UE. That is, for SINR 1 with port 1 as serving, port 3 is interfering and port 2 does not need to be accounted for (since port 2 and port 3 must be in the same group and only one of them can be used at a time), but for SINR 2 with port 2 as serving, port 3 should not be accounted for as serving or interfering. This can be supported via port/resource grouping as discussed before.

To support multi-TRP non-coherent joint transmission (NCJT), conventionally, a large number of measurement resource configurations and CQIs associated with different transmission hypotheses/schemes may be needed, leading a large number of CSI resource configurations and CSI report configurations. This issue may be resolved by the embodiments described above. In one embodiment, a UE may be configured with a group of CMR (or IMR) candidates for a report configuration, and the UE may select some of the candidates for CM (or IM) and report the indices of the selected one(s). An example is illustrated in Table 4 below for 2 TRPs, i.e., TRP A and TRP B (shown as A and B in Table 4 for illustration simplicity). The ordered number pair (x,y) in Table 4 represents (TRP A Tx or mute, TRP B Tx or mute). The value of each of x and y may be 0 or 1, e.g., with 0 representing mute, and 1 representing transmit (Tx). For example, (1,0) indicates that TRP A transmits and TRP B mutes on resources, and (1,1) indicates that TRPs A and TRP B transmit on the resources, etc. To support various transmission schemes, such as non-NCJT (e.g., only one of TRPs A and TRP B serving, and the other one interfering), DPS (e.g., only one of TRPs A and B serving and the other one interfering, with possibly fast switching between them), DPB (e.g., only one of TRPs A and B serving and the other one muting, with possibly fast switching between them), SDM (both TRPs serving on different spatial layers and possibly on overlapping time-frequency resources), etc., the UE may select one or more CMR candidates for CM, and one IMR candidate for IM. The letter "Y" in Table 4 indicates the UE's selection for each transmission scheme listed. The UE may report one or more CQIs to a gNB, as shown in Table 4. Note that some selections may be invalid, e.g., selecting CMR candidate 1 together with IMR candidate 2. These invalid selections need to be informed to the UE. In another embodiment, UE may be configured with a group of NZP resources for a report configuration, and the UE decides whether each of the group of NZP resources is CM (i.e., "S" shown in Table 5), IM (i.e., "I" shown in Table 5), or muting (i.e., "M" shown in Table 5). This example is illustrated in Table 5 below. For example, the UE may be configured with a CSI-IM (the UE does not need to decide the type of the CSI-IM because it is already configured for IM) and NZP 1 and NZP 2. The UE determines whether the NZP 1 and NZP 2 are for CM, IM, or muting, and determination criterion/rules may also be used. This embodiment provides flexibility for the UE to determine the types of the NZP 1 and NZP 2. The embodiment in Table 4 can also be supported via the framework of the embodiments as describe previously (via restricted types, for example).

TABLE 4

| | CMR candidate 1 (1, 0) | CMR candidate 2 (0, 1) | IMR candidate 1 (0, 0) | IMR candidate 2 (1, 0) | IMR candidate 3 (0, 1) |
|---|---|---|---|---|---|
| DPS: A serve, B interfere | Y | | | | Y |
| DPS: A interfere, B serve | | Y | | Y | |
| A B SDM | Y | Y | Y | | |
| DPB: A serve, B mute | Y | | Y | | |
| DPB: B serve, A mute | | Y | Y | | |

TABLE 5

| | NZP 1 (1, 0) | NZP 2 (0, 1) | CSI-IM (0, 0) |
|---|---|---|---|
| DPS: A serve, B interfere | S | I | I |
| DPS: A interfere, B serve | I | S | I |
| A B SDM | S | S | I |
| DPB: A serve, B mute | S | M | I |
| DPB: B serve, A mute | M | S | I |

Figure 16:
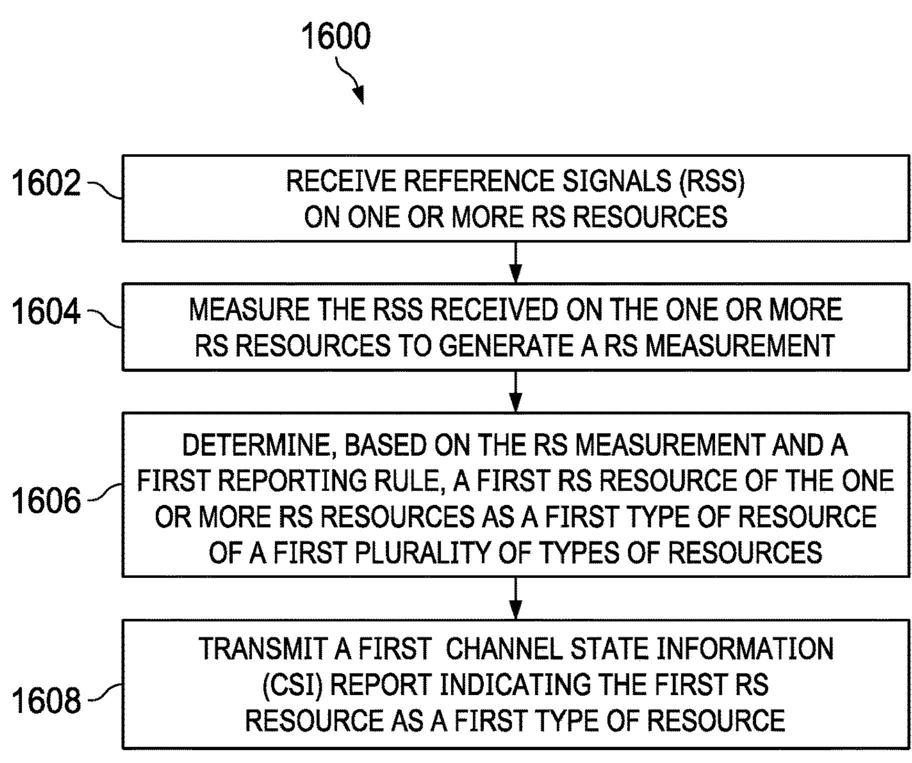
FIG. 16 illustrates a diagram of another embodiment CSI measurement and report method.

FIG. 16 illustrates a flowchart of an embodiment CSI measurement and report method 1600. The method may be indicative of operations by a UE. As shown, at step 1602, the UE receives reference signals (RSs) on one or more RS resources. At step 1604, the UE measures the RSs received on the one or more RS resources to generate a RS measurement. At step 1606, the UE determines, based on the RS measurement and a first reporting rule, a first RS resource of the one or more RS resources as a first type of resource of a first plurality of types of resources. At step **16*o*8**, the UE transmits a first channel state information (CSI) report indicating the first RS resource as a first type of resource.

Figure 17:
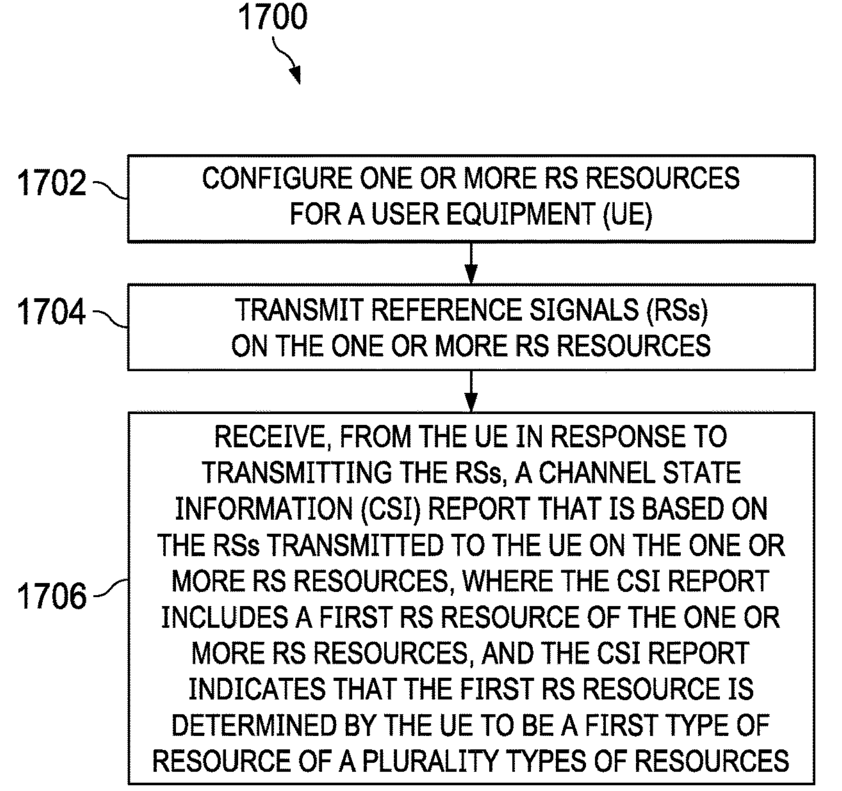
FIG. 17 illustrates a diagram of another embodiment CSI measurement and report method.

FIG. 17 illustrates a flowchart of another embodiment CSI measurement and report method 1700. The method may be indicative of operations at a base station. As shown, at step 1702, the base station configures one or more RS resources for a user equipment (UE). At step 1704, the base station transmits reference signals (RSs) on the one or more RS resources. At step 1706, the base station receives, from the UE in response to transmitting the RSs, a channel state information (CSI) report that is based on the RSs transmitted to the UE on the one or more RS resources. The CSI report includes a first RS resource of the one or more RS resources, and the CSI report indicates that the first RS resource is determined by the UE to be a first type of resource of a plurality of types of resources.

Figure 18:
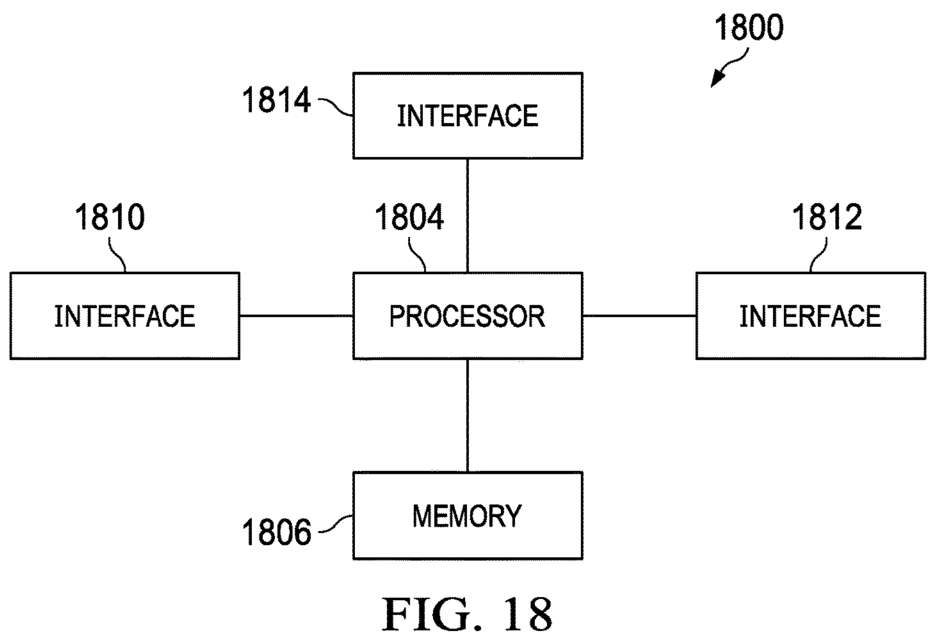
FIG. 18 illustrates a block diagram of an embodiment processing system.

FIG. 18 illustrates a block diagram of an embodiment processing system 1800 for performing methods described herein, which may be installed in a host device. As shown, the processing system 1800 includes a processor 1804, a memory 1806, and interfaces 1810-1814, which may (or may not) be arranged as shown in FIG. 18. The processor 1804 may be any component or collection of components adapted to perform computations and/or other processing related tasks, and the memory 1806 may be any component or collection of components adapted to store programming and/or instructions for execution by the processor 1804. In an embodiment, the memory 1806 includes a non-transitory computer readable medium. The interfaces 1810, 1812, 1814 may be any component or collection of components that allow the processing system 1800 to communicate with other devices/components and/or a user. For example, one or more of the interfaces 1810, 1812, 1814 may be adapted to communicate data, control, or management messages from the processor 1804 to applications installed on the host device and/or a remote device. As another example, one or more of the interfaces 1810, 1812, 1814 may be adapted to allow a user or user device (e.g., personal computer (PC), etc.) to interact/communicate with the processing system 1800. The processing system 1800 may include additional components not depicted in FIG. 18, such as long term storage (e.g., non-volatile memory, etc.).

In some embodiments, the processing system 1800 is included in a network device that is accessing, or part otherwise of, a telecommunications network. In one example, the processing system 1800 is in a network-side device in a wireless or wireline telecommunications network, such as a base station, a relay station, a scheduler, a controller, a gateway, a router, an applications server, or any other device in the telecommunications network. In other embodiments, the processing system 1800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 19:
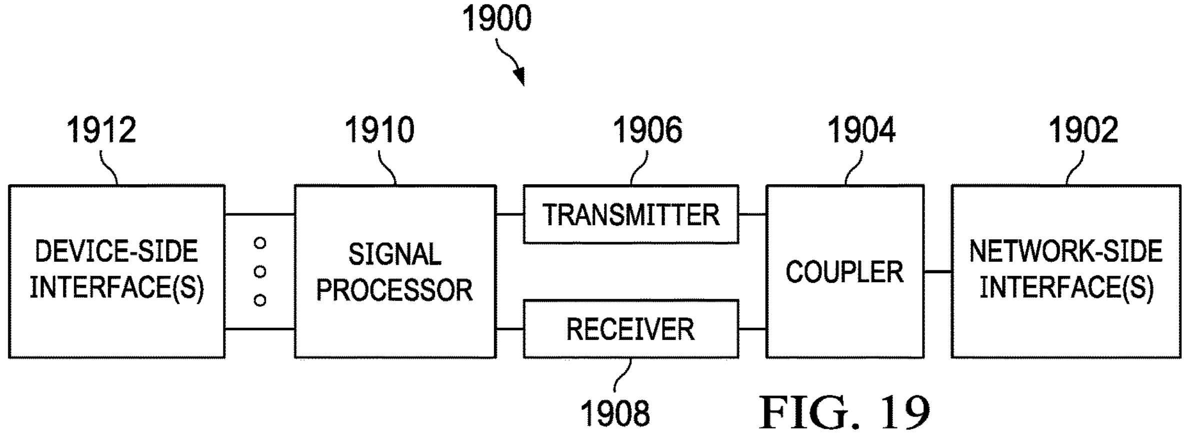
FIG. 19 illustrates a block diagram of an embodiment transceiver.

In some embodiments, one or more of the interfaces 1810, 1812, 1814 connects the processing system 1800 to a transceiver adapted to transmit and receive signaling over the telecommunications network. FIG. 19 illustrates a block diagram of a transceiver 1900 adapted to transmit and receive signaling over a telecommunications network. The transceiver 1900 may be installed in a host device. As shown, the transceiver 1900 comprises a network-side interface 1902, a coupler 1904, a transmitter 1906, a receiver 1908, a signal processor 1910, and a device-side interface 1912. The network-side interface 1902 may include any component or collection of components adapted to transmit or receive signaling over a wireless or wireline telecommunications network. The coupler 1904 may include any component or collection of components adapted to facilitate bi-directional communication over the network-side interface 1902. The transmitter 1906 may include any component or collection of components (e.g., up-converter, power amplifier, etc.) adapted to convert a baseband signal into a modulated carrier signal suitable for transmission over the network-side interface 1902. The receiver 1908 may include any component or collection of components (e.g., down-converter, low noise amplifier, etc.) adapted to convert a carrier signal received over the network-side interface 1902 into a baseband signal. The signal processor 1910 may include any component or collection of components adapted to convert a baseband signal into a data signal suitable for communication over the device-side interface(s) 1912, or vice-versa. The device-side interface(s) 1912 may include any component or collection of components adapted to communicate data-signals between the signal processor 1910 and components within the host device (e.g., the processing system 1800, local area network (LAN) ports, etc.).

The transceiver 1900 may transmit and receive signaling over any type of communications medium. In some embodiments, the transceiver 1900 transmits and receives signaling over a wireless medium. For example, the transceiver 1900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1902 comprises one or more antenna/radiating elements. For example, the network-side interface 1902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this application has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:

receiving, by a user equipment (UE), reference signals (RSs) on one or more RS resources, a first RS resource of the one or more RS resources being configured for a first plurality of types of CSI measurement;

performing, by the UE, one or more RS measurements on the RSs received on the one or more RS resources;

generating, by the UE based on the one or more RS measurements and a first reporting rule, a first CSI report, wherein the first CSI report is generated with the first RS resource used by the UE for a first type of CSI measurement of the first plurality of types of CSI measurement;

generating, by the UE based on the one or more RS measurements and the first reporting rule, a second COI value for the first CSI report, wherein the second COI value is generated with the first RS resource used by the UE as a second type of CSI measurement of the first plurality of types of CSI measurement; and reporting, by the UE, the first CSI report.

2. The method of claim 1, wherein the first CSI report comprises a first channel quality indicator (CQI) value derived based on the first RS resource used by the UE for the first type of CSI measurement.

3. The method of claim 1, wherein the one or more RS resources comprise one or more ports, and each RS resource of the one or more RS resources comprises at least one RS port of the one or more ports.

4. The method of claim 1, wherein the one or more RS resources are one or more non-zero power channel state information-reference signal (NZP CSI-RS) resources configured as a NZP CSI-RS resource set.

5. The method of claim 1, wherein the first plurality of types of CSI measurement comprises a type for channel measurement associated with a first transmission hypothesis/scheme, a type for channel measurement associated with a second transmission hypothesis/scheme, a type for interference measurement, or a type for muting.

6. The method of claim 1, wherein the first type of CSI measurement is a type for channel measurement associated with a first transmission hypothesis/scheme, a type for channel measurement associated with a second transmission hypothesis/scheme, a type for interference measurement, or a type for muting.

7. The method of claim 1, wherein the one or more RS resources and the first reporting rule are associated with a CSI report configuration.

8. The method of claim 1, wherein the first reporting rule specifies an efficiency requirement, a CQI requirement, a signal to noise ratio (SNR) requirement, a signal to interference and noise ratio (SINR) requirement, or a rank requirement, based on which the UE determines whether an RS resource is used for one or more of the first plurality of types of CSI measurement.

9. An apparatus comprising:

a non-transitory memory storage comprising instructions; and one or more processors in communication with the non-transitory memory storage, wherein the instructions, when executed by the one or more processors, cause the apparatus to perform:

receiving reference signals (RSs) on one or more RS resources, a first RS resource of the one or more RS resources being configured for a first plurality of types of CSI measurement;

performing one or more RS measurements on the RSs received on the one or more RS resources;

generating, based on the one or more RS measurements and a first reporting rule, a first CSI report, wherein the first CSI report is generated with the first RS resource used by the apparatus for a first type of CSI measurement of the first plurality of types of CSI measurement;

generating, based on the one or more RS measurements and the first reporting rule, a second CQI value for the first CSI report, wherein the second CQI value is generated with the first RS resource used as a second type of CSI measurement of the first plurality of types of CSI measurement; and reporting the first CSI report.

10. The apparatus of claim 9, wherein the first CSI report comprises a first channel quality indicator (CQI) value derived based on the first RS resource that is used by the apparatus for the first type of CSI measurement.

11. The apparatus of claim 9, wherein the one or more RS resources comprise one or more ports, and each RS resource of the one or more RS resources comprises at least one RS port of the one or more ports.

12. The apparatus of claim 9, wherein the one or more RS resources are one or more non-zero power channel state information-reference signal (NZP CSI-RS) resources configured as a NZP CSI-RS resource set.

13. The apparatus of claim 9, wherein the first plurality of types of CSI measurement comprises a type for channel measurement associated with a first transmission hypothesis/scheme, a type for channel measurement associated with a second transmission hypothesis/scheme, a type for interference measurement, or a type for muting.

14. The apparatus of claim 9, wherein the first type of CSI measurement is a type for channel measurement associated with a first transmission hypothesis/scheme, a type for channel measurement associated with a second transmission hypothesis/scheme, a type for interference measurement, or a type for muting.

15. The apparatus of claim 9, wherein the one or more RS resources and the first reporting rule are associated with a CSI report configuration.

16. The apparatus of claim 9, wherein the first reporting rule specifies an efficiency requirement, a CQI requirement, a signal to noise ratio (SNR) requirement, a signal to interference and noise ratio (SINR) requirement, or a rank requirement, based on which the apparatus determines whether an RS resource is used for one or more of the first plurality of types of CSI measurement.

17. A method comprising:

configuring, by a base station (BS), one or more RS resources for a user equipment (UE), a first RS resource of the one or more RS resources being configured for a first plurality of types of CSI measurement;

transmitting, by the BS to the UE, reference signals (RSs) on the one or more RS resources; and receiving, by the BS from the UE in response to transmitting the RSs, a channel state information (CSI) report, the CSI report being based on the RSs transmitted to the UE on the one or more RS resources and a first reporting rule configured by the BS for the CSI report, and the CSI report comprising a first channel quality indicator (CQI) value corresponding to the first RS resource as a resource for a first type of CSI measurement, wherein the CSI report further comprises a second CQI value corresponding to the first RS resource as a resource for a second type of CSI measurement of the first plurality of types of CSI measurement.

18. The method of claim 17, wherein the one or more RS resources comprise one or more ports, and each RS resource of the one or more RS resources comprises at least one RS port of the one or more ports.

19. The method of claim 17, wherein the one or more RS resources are one or more non-zero power channel state information-reference signal (NZP CSI-RS) resources configured as a NZP CSI-RS resource set.

20. The method of claim 17, wherein the first plurality of types of CSI measurement comprises a type for channel measurement associated with a first transmission hypothesis/scheme, a type for channel measurement associated with a second transmission hypothesis/scheme, a type for interference measurement, or a type for muting.

21. The method of claim 17, wherein the first type of CSI measurement is a type for channel measurement associated with a first transmission hypothesis/scheme, a type for channel measurement associated with a second transmission hypothesis/scheme, a type for interference measurement, or a type for muting.

22. The method of claim 17, wherein the first reporting rule specifies an efficiency requirement, a CQI requirement, a signal to noise ratio (SNR) requirement, a signal to interference and noise ratio (SINR) requirement, or a rank requirement, and enables the UE to determine whether an RS resource is used for one or more of the first plurality of types of CSI measurement.

23. An apparatus comprising:

a non-transitory memory storage comprising instructions; and one or more processors in communication with the non-transitory memory storage, wherein the instructions, when executed by the one or more processors, cause the apparatus to perform:

configuring one or more RS resources for a user equipment (UE), a first RS resource of the one or more RS resources being configured for a first plurality of types of CSI measurement;

transmitting, to the UE, reference signals (RSs) on the one or more RS resources; and receiving, from the UE in response to transmitting the RSs, a channel state information (CSI) report, the CSI report being based on the RSs transmitted to the UE on the one or more RS resources and a first reporting rule configured by the apparatus for the CSI report, and the CSI report comprising a first channel quality indicator (CQI) value corresponding to the first RS resource as a resource for a first type of CSI measurement, wherein the CSI report further comprises a second COI value corresponding to the first RS resource as a resource for a second type of CSI measurement of the first plurality of types of CSI measurement.

24. The apparatus of claim 23, wherein the one or more RS resources comprise one or more ports, and each RS resource of the one or more RS resources comprises at least one RS port of the one or more ports.

25. The apparatus of claim 23, wherein the one or more RS resources are one or more non-zero power channel state information-reference signal (NZP CSI-RS) resources configured as a NZP CSI-RS resource set.

26. The apparatus of claim 23, wherein the first plurality of types of CSI measurement comprises a type for channel measurement associated with a first transmission hypothesis/scheme, a type for channel measurement associated with a second transmission hypothesis/scheme, a type for interference measurement, or a type for muting.

27. The apparatus of claim 23, wherein the first type of CSI measurement is a type for channel measurement associated with a first transmission hypothesis/scheme, a type for channel measurement associated with a second transmission hypothesis/scheme, a type for interference measurement, or a type for muting.

* * * * *